(12) United States Patent  
Orhan et al.

(10) Patent No.: US 10,334,454 B2  
(45) Date of Patent: Jun. 25, 2019

(54) MULTI-FINGER BEAMFORMING AND ARRAY PATTERN SYNTHESIS

(71) Applicant: Intel Corporation, Santa Clara, CA (US)

(72) Inventors: Oner Orhan, Santa Clara, CA (US); Eren Sasoglu, Mountain View, CA (US); Hosein Nikopour, San Jose, CA (US); Shilpa Talwar, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/592,223

(22) Filed: May 11, 2017

(65) Prior Publication Data

US 2018/0331740 A1    Nov. 15, 2018

(51) Int. Cl.
*H04W 16/28* (2009.01)
*H04W 24/02* (2009.01)
(Continued)

(52) U.S. Cl.
CPC .......... *H04W 24/02* (2013.01); *H04B 7/0695* (2013.01); *H04B 17/102* (2015.01);
(Continued)

(58) Field of Classification Search
CPC ... H04B 7/0617; H04B 17/327; H04W 24/02; H04W 16/28; H01Q 3/26; H01Q 3/2605; H01Q 1/246
(Continued)

(56) References Cited

U.S. PATENT DOCUMENTS

| | | | | |
|---|---|---|---|---|
| 6,157,811 A | * | 12/2000 | Dent | H01Q 1/288 455/12.1 |
| 6,349,217 B1 | * | 2/2002 | Honcharenko | H04W 16/28 455/452.1 |

(Continued)

OTHER PUBLICATIONS

Francisco J. Ares-Pena et al., "Genetic Algorithms in the Design and Optimization of Antenna Array Patterns", IEEE Transactions on Antennas and Propagation, Mar. 1999, pp. 506-510, vol. 47, No. 3.

(Continued)

*Primary Examiner* — Hai V Nguyen
(74) *Attorney, Agent, or Firm* — Viering, Jentschura & Partner MBB

(57) ABSTRACT

A communication device includes an antenna array, and a beamforming controller configured to determine a set of beamforming weights for the antenna array based on a target radiation pattern having a plurality of main fingers, wherein the beamforming controller is configured to, in each of a plurality of iterations identify a search space of beamforming weights for a plurality of elements of the antenna array, and determine, based on contribution of one or more of the plurality of elements of to multiple of the plurality of main fingers, an updated set of beamforming weights in the search space to reduce a difference between an actual radiation pattern and the target radiation pattern, the antenna array configured to transmit or receive radio signals based on the updated set of beamforming weights.

18 Claims, 22 Drawing Sheets

(51) Int. Cl.
*H04B 17/327* (2015.01)
*H04W 52/36* (2009.01)
*H04W 52/42* (2009.01)
*H04B 17/10* (2015.01)
*H04B 7/06* (2006.01)

(52) U.S. Cl.
CPC ........ *H04B 17/327* (2015.01); *H04W 52/367* (2013.01); *H04W 52/42* (2013.01)

(58) Field of Classification Search
USPC ................................ 455/63.4; 342/359, 367
See application file for complete search history.

(56) References Cited

U.S. PATENT DOCUMENTS

| | | | | |
|---|---|---|---|---|
| 6,593,876 B2* | 7/2003 | Shuch | ................... | H01Q 3/26 342/351 |
| 7,031,754 B2* | 4/2006 | Scherzer | ............... | H04W 16/00 342/371 |
| 7,072,669 B1* | 7/2006 | Duckworth | .......... | G01S 5/0215 455/404.2 |
| 7,103,460 B1* | 9/2006 | Breed | .................. | B60C 23/0408 701/29.1 |
| 7,280,070 B2* | 10/2007 | Pillai | .................... | G01S 7/2813 342/174 |
| 7,312,750 B2* | 12/2007 | Mao | .................... | H01Q 3/2605 342/373 |
| 7,373,127 B2* | 5/2008 | Reed | .................... | H04B 7/086 455/259 |
| 7,415,117 B2* | 8/2008 | Tashev | .................. | H04R 3/005 367/119 |
| 7,456,726 B2* | 11/2008 | Hansen | ................ | G06K 7/0008 340/10.2 |
| 7,573,418 B2* | 8/2009 | Kawai | .................. | G01S 3/74 340/572.1 |
| 7,714,782 B2* | 5/2010 | Davis | .................... | H01Q 21/22 342/377 |
| 7,786,864 B1* | 8/2010 | Shostak | ................ | B60C 23/041 340/539.1 |
| 7,952,513 B2* | 5/2011 | Tietjen | .................. | F41G 3/147 342/118 |
| 8,068,049 B2* | 11/2011 | Salmon | ................ | G01K 11/006 342/22 |
| 8,340,584 B2* | 12/2012 | Lakshmanan | ........ | H04B 7/0452 455/63.4 |
| 8,416,802 B2* | 4/2013 | Jin | ...................... | H04W 72/005 370/464 |
| 8,787,343 B2* | 7/2014 | Taghavi | ............... | H04B 7/0851 370/310 |
| 8,923,529 B2* | 12/2014 | McCowan | ............ | H04R 3/005 381/122 |
| 9,083,426 B1* | 7/2015 | Freedman | ............ | H01Q 3/2605 |
| 9,287,948 B2* | 3/2016 | Kim | ................... | H04B 7/0639 |
| 9,450,666 B1* | 9/2016 | Freedman | ............ | H01Q 3/2605 |
| 9,462,380 B2* | 10/2016 | McCowan | ............ | H04R 3/005 |
| 9,715,609 B1* | 7/2017 | Fink | .................. | G06K 7/10366 |
| 9,806,777 B1* | 10/2017 | Doostnejad | .......... | H04B 7/0456 |
| 9,882,620 B2* | 1/2018 | Guey | .................. | H04L 27/2607 |
| 9,917,658 B2* | 3/2018 | Hu | ........................... | H04B 7/06 |
| 9,923,621 B2* | 3/2018 | Campos | ................. | H04B 7/12 |
| 9,935,700 B2* | 4/2018 | Kim | ................... | H04B 7/0456 |
| 9,967,081 B2* | 5/2018 | Yang | .................. | H04B 7/0413 |
| 9,977,121 B1* | 5/2018 | Fink | .................. | G06K 7/10366 |
| 2002/0169578 A1* | 11/2002 | Yang | .......................... | G01S 3/36 702/152 |
| 2002/0193104 A1* | 12/2002 | Scherzer | ............... | H04W 16/00 455/423 |
| 2003/0081503 A1* | 5/2003 | Barnard | ............... | G01S 3/8086 367/103 |
| 2004/0178862 A1* | 9/2004 | Kaplan | .................. | H01Q 3/26 333/117 |
| 2005/0136980 A1* | 6/2005 | Kim | ....................... | H01Q 1/246 455/562.1 |
| 2005/0192727 A1* | 9/2005 | Shostak | .................. | B60C 11/24 701/37 |
| 2005/0195103 A1* | 9/2005 | Davis | ........................ | G01S 3/74 342/99 |
| 2005/0195988 A1* | 9/2005 | Tashev | ................... | H04R 3/005 381/92 |
| 2005/0273218 A1* | 12/2005 | Breed | ...................... | B60C 11/24 701/2 |
| 2005/0280504 A1* | 12/2005 | Pettus | ................... | G06K 19/0672 340/10.1 |
| 2006/0114148 A1* | 6/2006 | Pillai | ..................... | G01S 7/2813 342/195 |
| 2006/0246863 A1* | 11/2006 | Reed | ...................... | H04B 7/086 455/276.1 |
| 2007/0275761 A1* | 11/2007 | Jin | ......................... | H04W 16/28 455/562.1 |
| 2007/0285315 A1* | 12/2007 | Davis | ........................ | G01S 3/74 342/377 |
| 2009/0284405 A1* | 11/2009 | Salmon | ................. | G01K 11/006 342/22 |
| 2010/0056059 A1* | 3/2010 | Lakshmanan | ........ | H04B 7/0452 455/63.1 |
| 2010/0150129 A1* | 6/2010 | Jin | ...................... | H04W 72/005 370/343 |
| 2011/0070840 A1* | 3/2011 | Nielsen | ................... | H04B 7/028 455/67.11 |
| 2011/0175791 A1* | 7/2011 | Ozdemir | .................. | H01Q 1/00 343/876 |
| 2011/0201357 A1* | 8/2011 | Garrett | ................... | G01S 5/0252 455/456.2 |
| 2011/0241931 A1* | 10/2011 | Krich | .................... | G01S 7/2813 342/159 |
| 2011/0241941 A1* | 10/2011 | Krich | ....................... | H01Q 3/26 342/373 |
| 2011/0286372 A1* | 11/2011 | Taghavi | ............... | H04B 7/0851 370/310 |
| 2013/0057432 A1* | 3/2013 | Rajagopal | ................ | H01Q 3/26 342/368 |
| 2013/0170452 A1* | 7/2013 | Kwon | ................... | H04W 72/04 370/329 |
| 2015/0215853 A1* | 7/2015 | Ling | .................... | H04W 64/003 370/254 |
| 2015/0301154 A1* | 10/2015 | Fehling | ................. | G01S 5/0278 342/368 |
| 2015/0326289 A1* | 11/2015 | Kim | ..................... | H04B 7/0639 375/267 |
| 2016/0013855 A1* | 1/2016 | Campos | .............. | H04B 7/12 370/343 |
| 2016/0087765 A1* | 3/2016 | Guey | .................. | H04L 27/2607 370/330 |
| 2016/0226601 A1* | 8/2016 | Hu | ........................... | H04B 7/06 |
| 2016/0359596 A1* | 12/2016 | Wild | .................. | H04B 7/0695 |
| 2017/0093475 A1* | 3/2017 | Smith | .................. | H04B 7/0617 |
| 2017/0111852 A1* | 4/2017 | Selen | .................. | H04W 48/16 |
| 2017/0134083 A1* | 5/2017 | Kim | ................... | H04B 7/0456 |
| 2017/0163327 A1* | 6/2017 | Yang | .................. | H04B 7/0413 |
| 2017/0272223 A1* | 9/2017 | Kim | ................... | H04B 7/0617 |
| 2017/0366242 A1* | 12/2017 | Lee | ...................... | H01Q 1/243 |
| 2018/0097558 A1* | 4/2018 | Girnyk | ................. | H01Q 1/246 |
| 2018/0115342 A1* | 4/2018 | Doane | .................. | H01Q 3/247 |
| 2018/0212670 A1* | 7/2018 | Campos | ................. | H04B 7/12 |

OTHER PUBLICATIONS

Bruno Pompeo et al., "Phase-only pattern synthesis using a modified Least Squares Method for phased arrays", Proceedings of the 10th European Radar Conference, Oct. 9-11, 2013, pp. 443-446.

Omar Aldayel et al., "Successive QCQP Refinement for MIMO Radar Waveform Design Under Practical Constraints", IEEE Transactions on Signal Processing, Jul. 15, 2016, pp. 3760-3774, vol. 64, No. 14.

Omar Aldayel et al., "Tractable MIMO Beampattern Design Under Constant Modulus Waveform Constraint", 2016 IEEE Radar Conference, 2016.

(56) References Cited

OTHER PUBLICATIONS

Stephen Boyd, "Constrained Least Squares", Nov. 15, 2016, pp. 1-20.

* cited by examiner

US 10,334,454 B2

MULTI-FINGER BEAMFORMING AND ARRAY PATTERN SYNTHESIS

TECHNICAL FIELD

Various embodiments relate generally to methods and devices for multi-finger beamforming and array pattern synthesis.

BACKGROUND

Antenna-based communication systems may utilize beamforming in order to create steered antenna beams with an antenna array. Beamforming systems may adjust the phase and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable and adaptable radiation pattern providing different beamgain in different directions.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
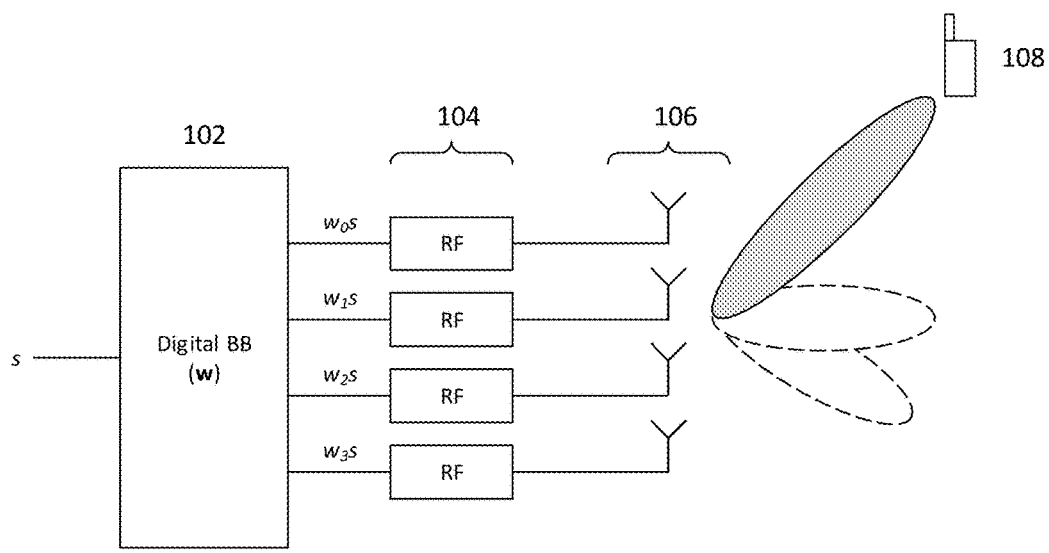
FIGS. 1A and 1B show simplified devices for baseband and RF beamforming according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2002000 (CDMA2002000), Universal Mobile Telecommunications System (UMTS), Long Term Evolution (LTE), General Packet Radio Service (GPRS), Evolution-Data Optimized (EV-DO). Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, i.e. including GPRS, EDGE, and any other related GSM technologies. Likewise, the term UMTS refers to both circuit- and packet-switched GSM, i.e. including HSPA, HSDPA/HSUPA, HSDPA+/HSUPA+, and any other related UMTS technologies.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Next-generation communication systems, such as those based on multiple-input multiple-output (MIMO) and millimeter wave (mmWave) technologies, are expected to have large-scale antenna arrays. These next-generation communication systems may utilize such large-scale antenna arrays to realize steerable and shapeable antenna radiation patterns that can provide varying degrees of beamgain in different directions.

Figure 1B:
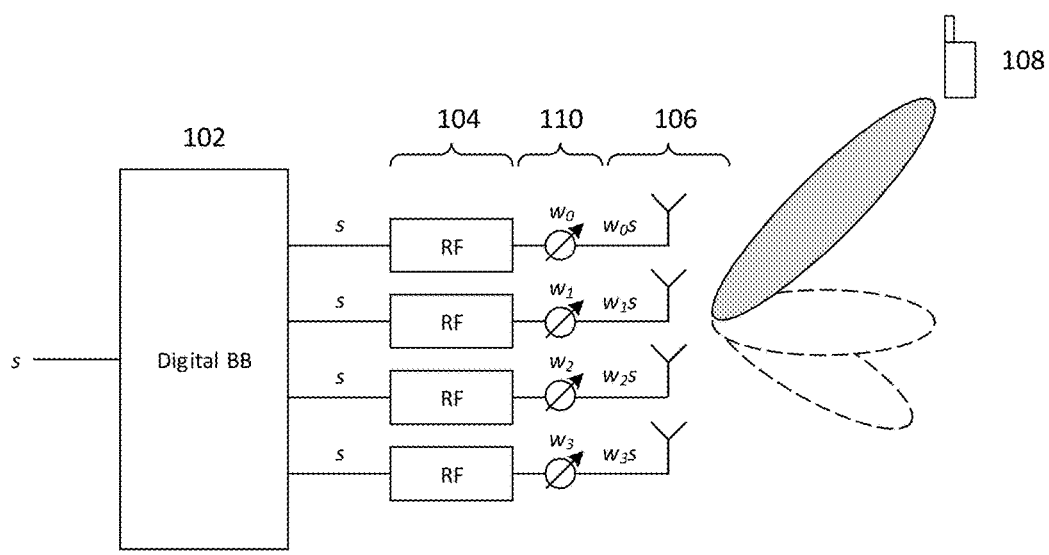

Beamforming systems may perform processing at baseband and/or RF frequencies to shape the radiation pattern of an antenna array. FIGS. 1A and 1B show two simplified beamforming approaches as deployed for an exemplary four-element linear antenna array. Although examples in the following description may focus on a transmit beamforming context, skilled persons will appreciate that these descriptions can be analogously applied for receive beamforming, which may include combining the signals received at the antenna elements according to a complex beamforming weight array in order to adjust the received beam pattern.

FIG. 1A illustrates a simplified digital beamforming architecture that digitally applies complex beamforming weights (composed of both a gain and phase factor) in the baseband domain. As shown in FIG. 1A, digital baseband controller 102 may receive baseband symbol s and (in addition to other digital baseband operations) subsequently apply a complex beamforming weight vector $w=[w_0\ w_1\ w_2\ w_3]^T$ to s to generate weighted symbols ws, where each element $w_i$, i=0, 1, 2, 3, is a complex beamforming weight. Accordingly, each resulting element $[w_0s\ w_1s\ w_2s\ w_3s]^T$ may be a baseband symbol s multiplied by some complex beamforming weight $w_i$. Digital baseband controller 102 may then map each element of ws to a respective RF chain of RF chain array 104, which may each perform digital-to-analog conversion (DAC), radio carrier modulation, and amplification on the received weighted symbols before providing the resulting RF symbols to a respective element of antenna array 106. Antenna array 106 may then wirelessly transmit each RF symbol.

By manipulating the beamforming weights of w, digital baseband controller 102 may be able to utilize each of the four antenna elements of antenna array 106 to produce a steered beam that has a greater beamgain compared to a single antenna element. The radio signals emitted by each element of antenna array 106 may combine to realize a combined waveform that exhibits a pattern of constructive and destructive interference that varies over distances and direction from antenna array 106. Depending on a number of factors (including e.g. antenna array spacing and alignment, radiation patterns, carrier frequency, etc.), the various points of constructive and destructive interference of the combined waveform may create a focused beam lobe that can be "steered" in direction via adjustment of the phase and gain factors $w_i$ of w. FIG. 1A shows several exemplary steered beams, or 'lobes', emitted by antenna array 106, which digital baseband controller 102 may directly control by adjusting w. Adjustment of w may enable digital baseband controller 102 to manipulate the radiation pattern produced by antenna array 106 to form various different patterns, including direction and beamgain of main lobes, direction and suppression of sidelobes, and null steering.

In so-called adaptive beamforming approaches, digital baseband controller 102 may dynamically change the beamforming weights in order to adjust the direction and strength of the main lobe in addition to nulls and sidelobes. Such adaptive approaches may allow digital baseband controller 102 to steer the beam in different directions over time, which may be useful to track the location of a moving target point (e.g. a moving receiver or transmitter). In a mobile communication context, digital baseband controller 102 may identify the location of a target terminal device 108 (e.g. the direction or angle of terminal device 108 relative to antenna array 106) and subsequently adjust w in order to generate a beam pattern with a main lobe pointing towards terminal device 108, thus improving the array gain at terminal device 108 and consequently improving the receiver performance. Through adaptive beamforming, digital baseband controller 102 may be able to dynamically adjust or "steer" the beam pattern as terminal device 108 moves in order to continuously provide focused transmissions to terminal device 108 (or conversely focused reception).

FIG. 1B illustrates an exemplary RF beamforming architecture that applies complex beamforming weights in the RF domain. As shown in FIG. 1B, digital baseband controller 102 may similarly receive baseband symbol s and (in addition to other digital baseband operations) split s into four duplicate symbols s. Digital baseband controller 102 may then provide symbols s to each of the RF chains of RF chain array 104, which may each perform DAC, radio carrier modulation, and amplification on the symbols s. The RF chains of RF chain array 104 may then provide the resulting symbols s (for which the notation s is maintained for simplicity) to RF beamforming circuits 110, which may each apply a respective complex beamforming weight $w_i$, i=0, 1, 2, 3, to s to obtain weighted symbols $w_i$s. RF beamforming circuits 110 may then provide the resulting symbols $w_i$s to antenna array 106 for transmission.

Due to the complexity related to the implementation of RF circuitry, RF beamforming circuits 110 may be constrained with respect to the possible complex beamforming weights $w_i$. For example, some implementations may utilize a phase-only approach in which RF beamforming circuits 110 are RF phase shifters that are capable of phase-shifting but not gain adjustment. Accordingly, in these cases $w_i$ would be bound to $|w_i|=1$. In other cases, RF beamforming circuits 110 may be implemented that are capable of phase and amplitude control, although the degree of amplitude control may be limited compared to the digital beamforming case.

While the examples shown in FIGS. 1A and 1B depict the use of four antennas, many next-generation communication systems are expected to deploy massive antenna arrays having 64, 128, 256, or higher antennas in a given array. These massive antenna arrays may offer a large degree of control over formulation of antenna radiation patterns. In addition to providing a high beamgain in a specific direction (e.g., to serve a single target user), another goal of these next-generation communication systems is to provide multi-finger beamforming, where multiple main lobes, or 'fingers', can be respectively directed to in different directions. Next-generation communication systems may therefore utilize multi-finger beamforming setups for different single-stream use cases (where the same baseband data is transmitted through all elements of the antenna array), such as for multicast transmissions to multiple users (e.g., for control channel transmission) or to provide a reliable connection through beam diversity (e.g., providing multiple beams at different directions for a single user, such as if a line-of-sight (LOS) path is obstructed).

Existing multi-finger beamforming solutions, however, currently suffer from several deficiencies. Many existing multi-finger beamforming solutions produce the different fingers in the radiation pattern by splitting up the antenna array into multiple sub-arrays, and then using the elements of each sub-array to form separate beams steered in different directions (e.g., by using a separate set of complex beamforming weights for each sub-array). However, these solutions are limited by the fact that only a single beam can be generated per sub-array (e.g., one per RF-chain). Additionally, there may be high beam steering error and little control over the beam gains, while the ability to control and suppress sidelobes may also be limited.

In addition to multi-finger beamforming, next-generation communication systems may also target array pattern synthesis. While multi-finger beamforming mainly addresses the formation of multiple fingers steered in specific directions, array pattern synthesis focuses on realizing a specific radiation pattern including main finger direction and gain control, sidelobe reduction, interference suppression, null-steering, beam broadening, etc. This array pattern synthesis is considered a much more complex problem than multi-finger beamforming, as a set of complex beamforming weights needs to be derived that realizes an entire radiation pattern (e.g., defined by desired gains across a comprehensive set of angles). Existing solutions for array pattern synthesis may use a "trial and error"-type solution, in which a large array of initial points is tested and evaluated to determine which produces the best match to a desired radiation pattern. This, however, is inefficient and can often produce sub-optimal results.

Accordingly, advantageous aspects of this disclosure present improved techniques for multi-finger beamforming and array pattern synthesis. These aspects can use weighted least-squares optimization to derive a set of complex beamforming weights w that, when applied at an antenna array (e.g., either at baseband or RF), realizes a desired radiation pattern. Various aspects detailed herein may also reformulate generalized least-squares problems into convex problems that can be solved with reduced complexity, thus also providing the possibility to use such techniques in adaptive beamforming.

Figure 2:
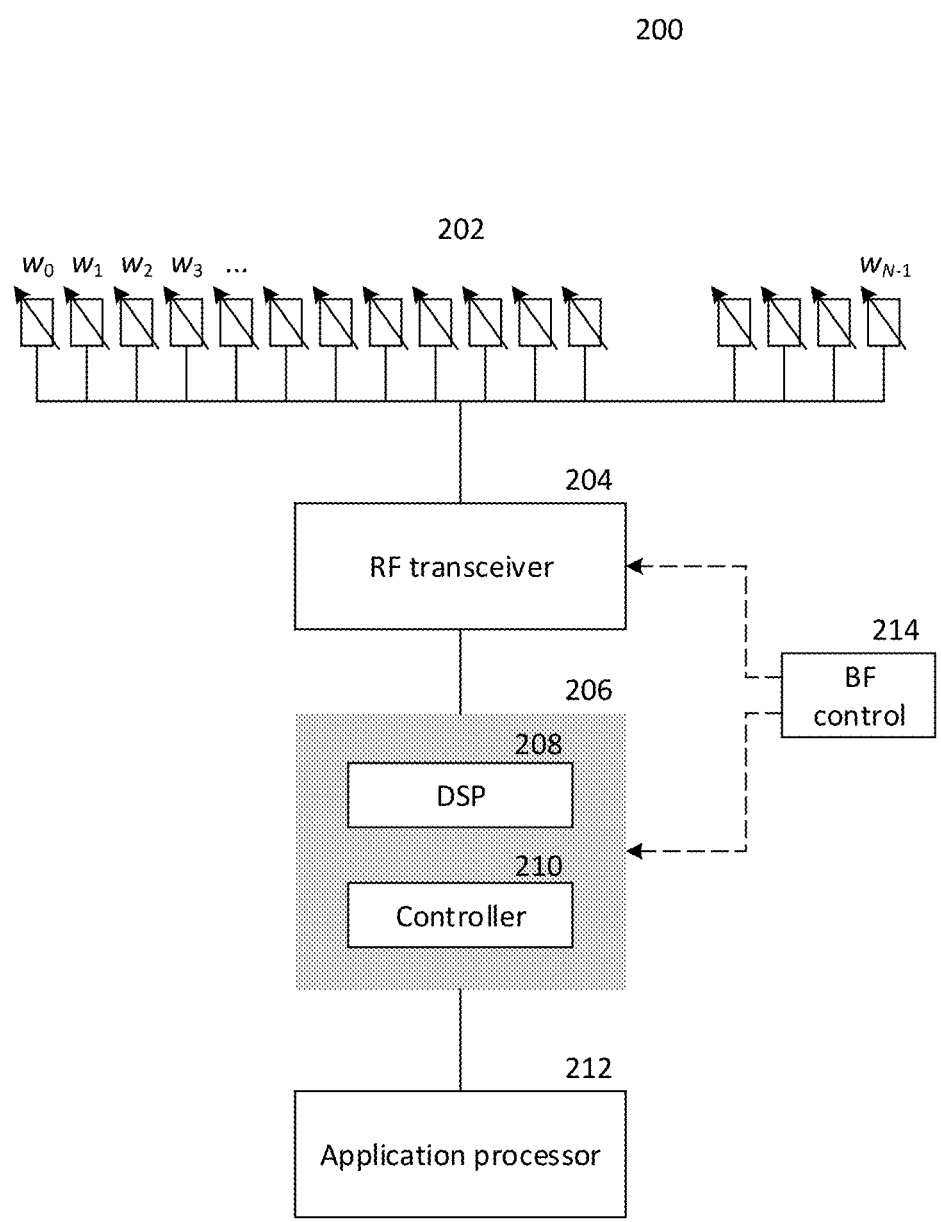
FIG. 2 shows a communication system for beamforming according to some aspects.

FIG. 2 shows 200communication device 200 including antenna array 202, RF transceiver 204, baseband modem 206, application processor 212, and beamforming controller 214. 200Communication device 200 may be implemented into and/or be a component of any radio communication device, such as any type of terminal device or network access node. Accordingly, 200communication device 200 may implement the beamforming techniques detailed herein in the uplink direction or the downlink direction Although not explicitly shown in FIG. 2, in some aspects communication device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Communication device 200 may transmit and receive radio signals on one or more radio access networks. Baseband modem 206 may direct such communication functionality of communication device 200 according to the communication protocols associated with each radio access network, and may execute control over antenna system 202 and RF transceiver 204 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of communication device 200 shown in FIG. 2 depicts only a single instance of such components.

Communication device 200 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Communication device 200 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of communication device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of communication device 200 in order to transmit and receive communication signals in accordance with the corresponding protocol control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio communication device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

In some aspects, communication device 200 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Application processor 212 may be a CPU, and may be configured to handle the layers above the protocol stack, including the transport and application layers. Application processor 212 may be configured to execute various applications and/or programs of communication device 200 at an application layer of communication device 200, such as an operating system (OS), a user interface (UI) for supporting user interaction with communication device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

As shown in FIG. 2, antenna array 202 may include N antennas. In some aspects, antenna array 202 may be a uniform linear array, while in some aspects antenna array 202 may be a rectangular array. Although various multi-finger beamforming aspects may be detailed herein with respect to linear arrays, these aspects can be extended to rectangular arrays via the two-dimensional Kroenecker product.

Beamforming controller 214 include hardware and/or software components. For example, in some aspects beamforming controller 214 may include one or more processors configured to retrieve and execute program code that defines the control and algorithmic functionalities of beamforming controller 214 as shown and described for FIGS. 4, 5, 11, and 13. In some aspects, beamforming controller 214 may include digitally-configured hardware (e.g., dedicated digital logic designed for specific functionalities) that is configured to perform control and/or algorithmic operations. In some aspects, beamforming controller 214 may include a combination of processors and digitally-configured hardware. Given the logical equivalence between hardware-defined and software-defined implementations, beamforming controller 214 is therefore not particularly limited to any particular hardware-defined or software-defined configuration. It is thus appreciated that the control and algorithmic logic described below may be embodied with many different configurations of hardware-defined and/or software-defined circuitry. Although shown separately in FIG. 2, in some aspects beamforming controller 208 may be included as part of another component of communication device 200, such as a component of baseband modem 206. The depiction of beamforming controller 208 as a separate component therefore reflects the functional separation of beamforming controller 208, although beamforming controller 208 may be physically integrated into another component of communication device 200.

Beamforming controller 214 may be configured to determine complex beamforming weights (e.g., in the manner of w as introduced above) and implement the beamforming weights at 200communication device 200. In some aspects, 200communication device 200 may utilize digital beamforming, in which case beamforming controller 214 may provide the complex beamforming weights to digital signal processor 208 of baseband modem 206 (e.g., in the manner of digital baseband controller 102 of FIG. 1A), which may digitally apply the complex beamforming weights to outgoing baseband data. In the transmit direction, RF transceiver 204 may then process the weighted data according to transmit-path processing operations (e.g., amplification, mixing, ADC/DAC) and provide the resulting RF data to antenna array 202 for transmission. In some aspects, 200communication device 200 may utilize RF beamforming, in which case beamforming controller 214 may provide the complex beamforming weights to RF beamforming circuits of RF transceiver 204 (e.g., in the manner of RF beamforming circuits 110 of FIG. 1B). In the transmit direction, the RF beamforming circuits may apply the complex beamforming weights to outgoing RF data provide the resulting weighted RF data to antenna array 202 for transmission. Beamforming controller 214 may similarly provide the complex beamforming weights (which may be the same in both the transmit and receive directions) to RF transceiver 204 in the receive direction.

As denoted in FIG. 2, the i-th antenna of antenna array 202 may have a complex beamforming weight of $w_i$, where the complex beamforming weight of the entirety of antenna array 202 can be represented as $w=[w_0\ w_1\ w_2\ w_3]^T$. As indicated above, RF transceiver 204 may apply the complex beamforming weights $w_i$ in a digital or RF manner.

Figure 3:
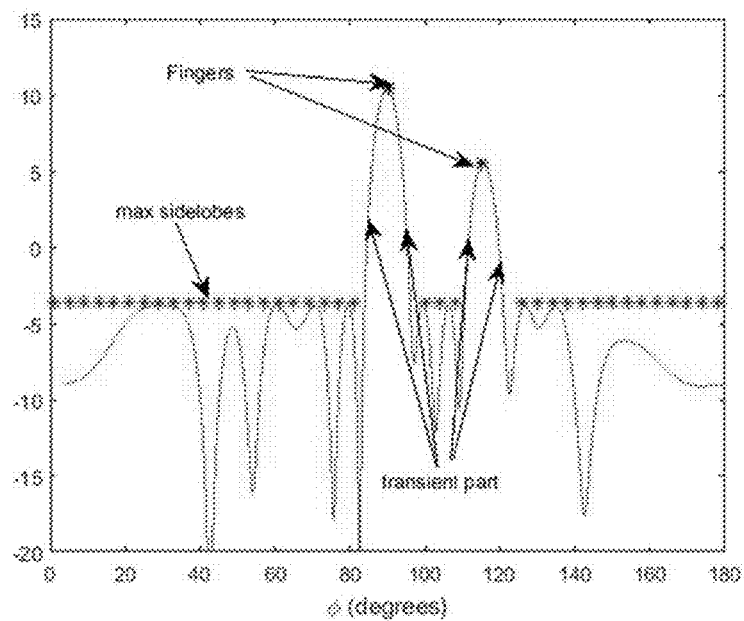
FIG. 3 shows an exemplary radiation pattern for multi-finger beamforming according to some aspects.

As previously indicated, multi-finger beamforming may target the realization of a radiation pattern with high-beam-gain fingers steered in multiple directions. Multi-finger beamforming may also target a radiation pattern having sidelobe levels below a certain power level. Beamforming controller 214 may therefore be configured to calculate the complex beamforming weight vector w that, when implemented at RF transceiver 204, generates a radiation pattern at antenna array 202 having the desired fingers and sidelobe power upper-bound. FIG. 3 shows an exemplary radiation pattern 300 having two main fingers at different angular directions and sidelobes that are all constrained below a particular power upper-bound.

In order to calculate complex beamforming weights w that produce the desired radiation pattern, beamforming controller 214 may start with input parameters that numerically define the desired radiation pattern, including the angular direction of the fingers, power at each finger, and upper-bound power for the sidelobes. Given these parameters as inputs, beamforming controller 214 may execute algorithmic logic (e.g., as program code or at digitally-configured hardware circuitry) that calculates the complex beamforming weights w. As will be detailed, in some aspects beamforming controller 214 may execute algorithmic logic based on least-squares minimization to iteratively derive complex beamforming weights w that produce a radiation pattern that approaches the desired radiation pattern defined by the input parameters.

Figure 4A:
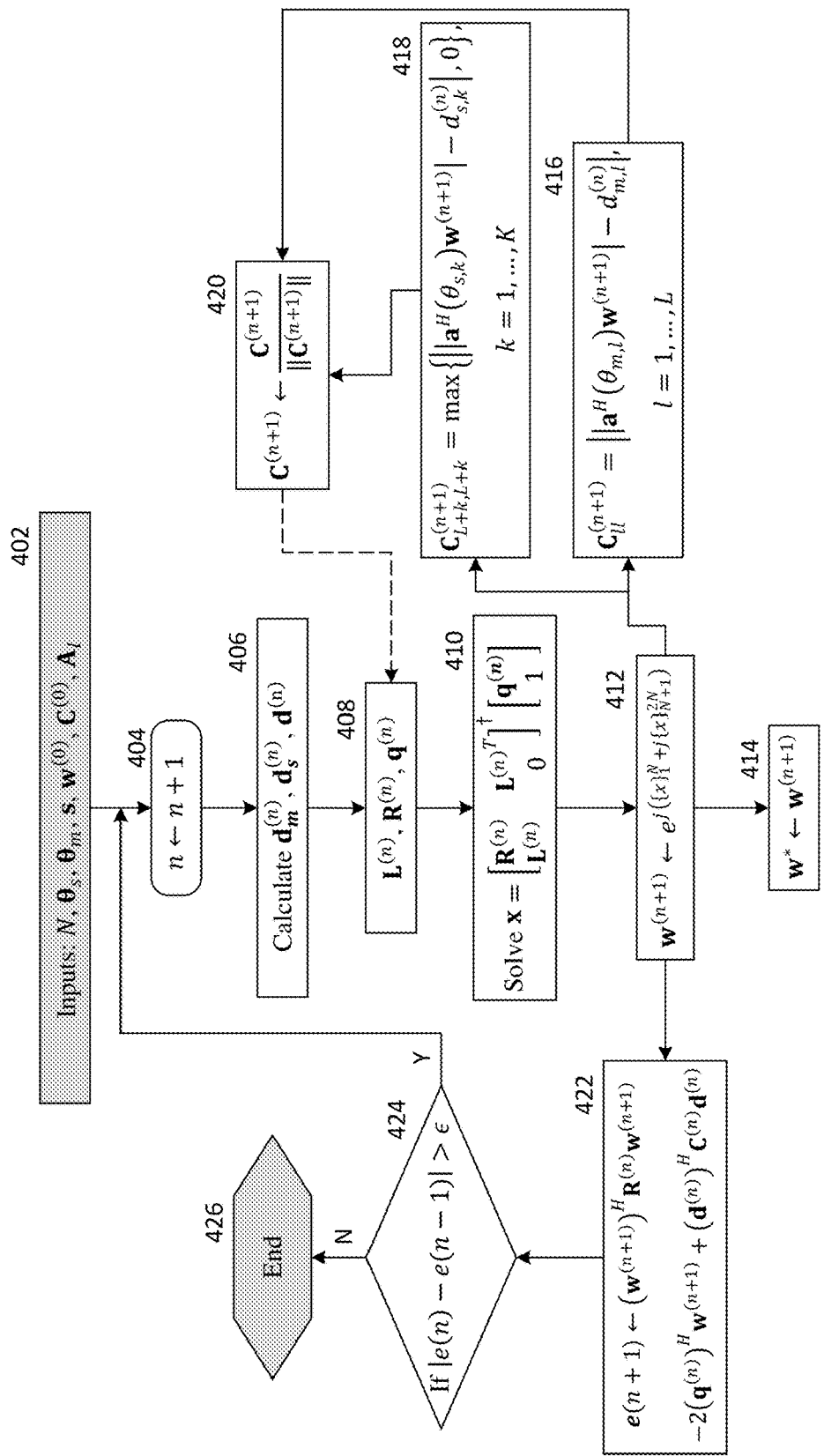
FIGS. 4A and 4B show an exemplary inner loop for performing multi-finger beamforming according to some aspects.
Figure 4B:
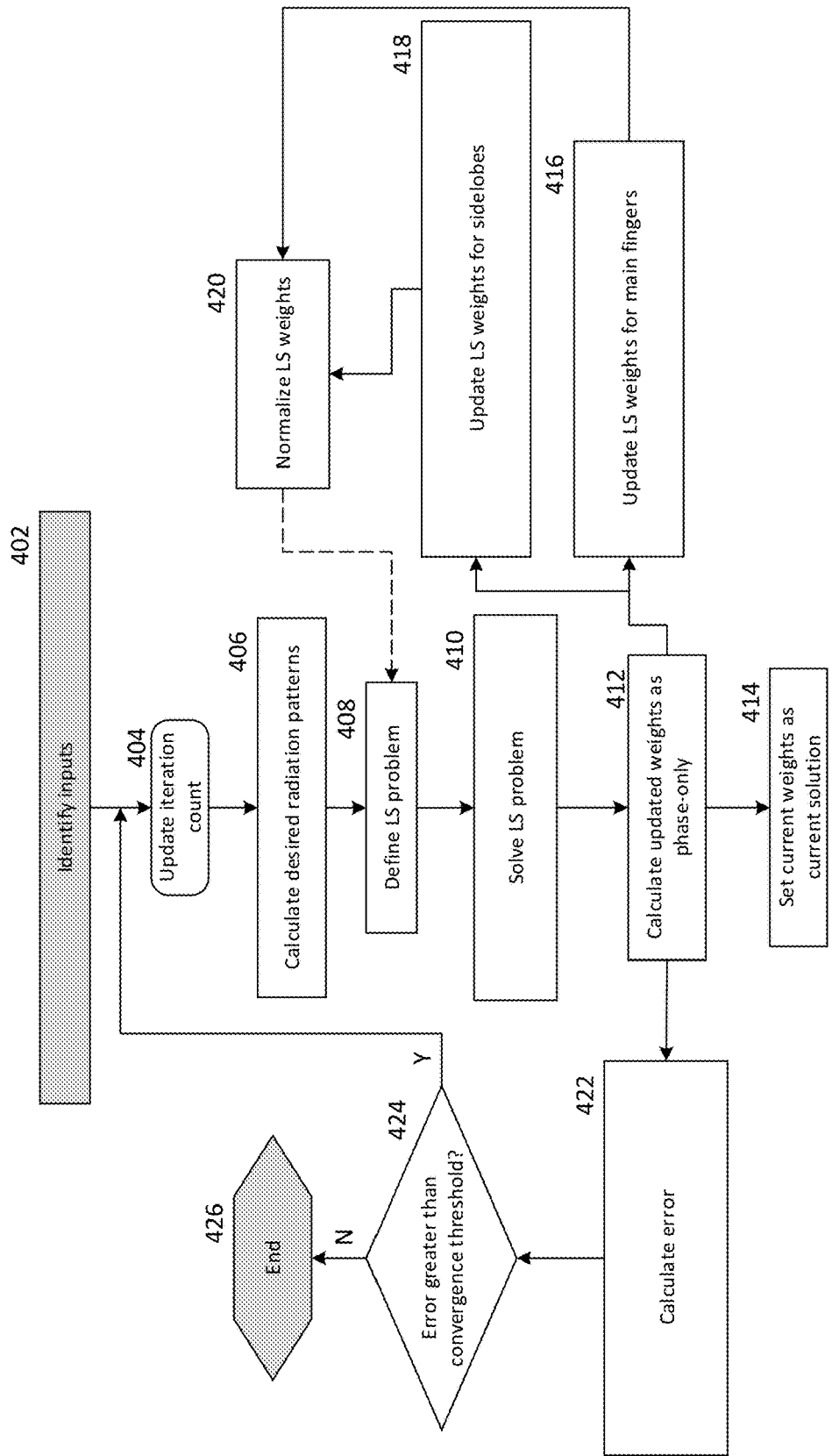
Figure 5A:
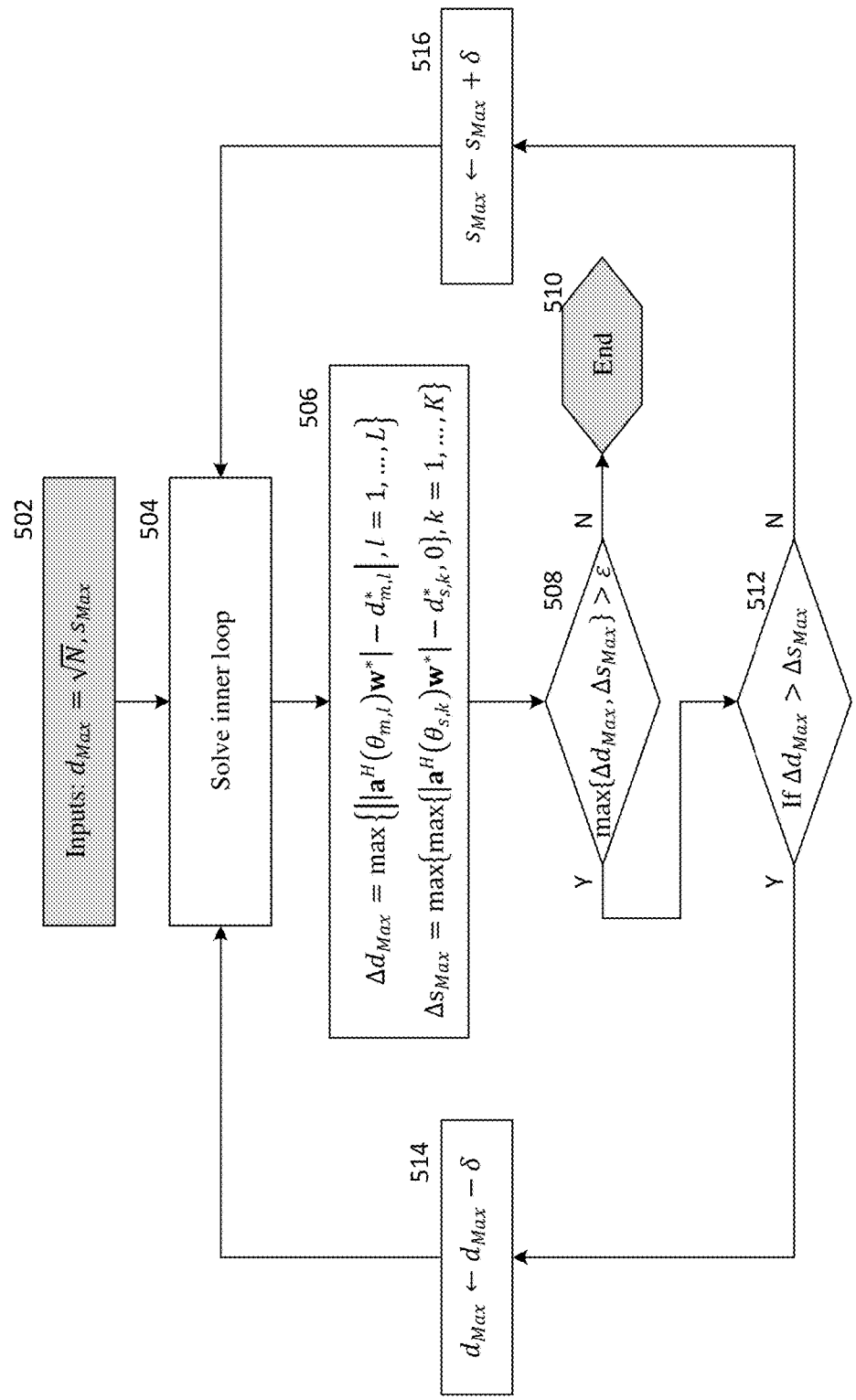
FIGS. 5A and 5B shows an exemplary outer loop for performing multi-finger beamforming according to some aspects.
Figure 5B:
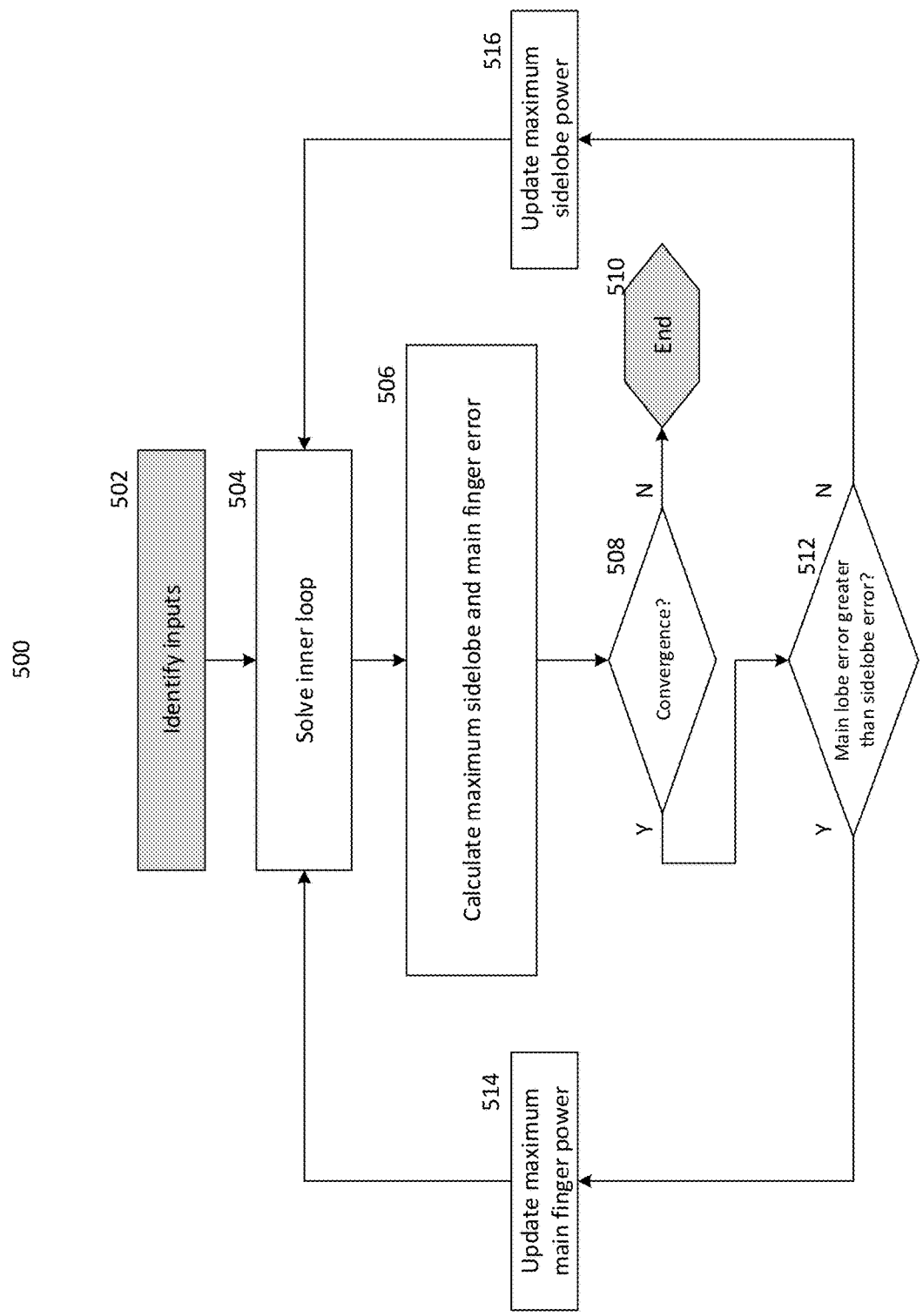

FIGS. 4A-4B and 5A-5B show flow charts illustrating the process by which beamforming controller 214 determines the complex beamforming weights w according to some aspects, where FIGS. 4A-4B show inner loop 400 and FIGS. 5A-5B show outer loop 500 of the process. As will be detailed, beamforming controller 214 may execute inner loop 400 to determine complex beamforming weights w that produce a radiation pattern with L fingers having specific power levels relative to one another (defined by vector s). Beamforming controller 214 may execute outer loop 500 to calculate the maximum finger power level $d_{Max}$ (the power level of the finger with the highest power level) and the maximum sidelobe power level $s_{Max}$ (the upper-bound on all of the sidelobes). As previously described, in some aspects beamforming controller 214 may include one or more processors configured to retrieve and execute program code that defines the logic of inner loop 400 and outer loop 500 as executable instructions. In some aspects, beamforming controller 214 may include one or more hardware circuits that are configured with digital logic constituting that of inner loop 400 and outer loop 500.

FIG. 4A expresses inner loop 400 algorithmically while FIG. 4B expresses inner loop 400 in prose, where the underlying logic at each stage in both expressions is equivalent. Likewise, FIG. 5A expresses outer loop 500 algorithmically while FIG. 5B expresses outer loop 500 in prose, where the underlying logic at each stage in both expressions is equivalent. Stages 402 (of inner loop 400) and 502 (of outer loop 500) show the input parameters to multi-finger beamforming process. As shown in stage 402, inner loop 400 may receive the following inputs:

N number of antennas
$\theta_s$ azimuth angles of sidelobes
$\theta_m$ azimuth angles of main fingers
s relative gains of main fingers)
$w^{(0)}$ initial complex beamforming weights
$C^{(0)}$ initial least-squares weights
$A_l$ DFT sub-matrix N therefore gives the number of antennas in antenna array 202. Sidelobe azimuth angle vector $\theta_s=[\theta_{s,1}\ldots\theta_{s,K}]$, where each $\theta_{s,k}$, k=1, . . . , k gives the desired azimuth angles of the k-th sidelobe (e.g., expressed in radians or degrees), while main finger azimuth angle vector $\theta_m=[\theta_{m,1}\ldots\theta_{m,L}]$, where each $\theta_{m,l}$, l=1, . . . , L gives the desired azimuth angles of the l-th main finger. In some aspects, the azimuth angles corresponding to the transient parts of the fingers (as identified in FIG. 3) can be omitted from $\theta_s$ and $\theta_m$.

Figure 6:
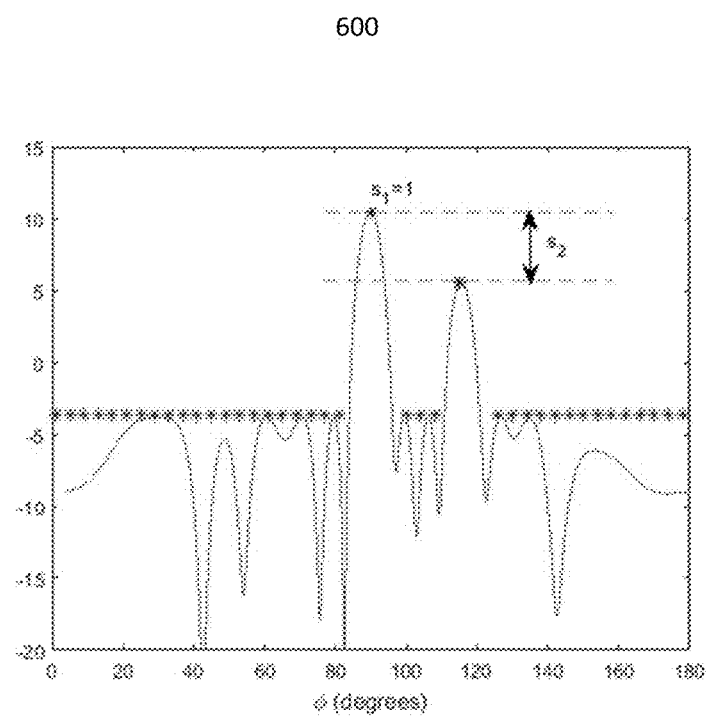
FIG. 6 shows an illustrative example of a target radiation pattern defined by relative power levels of main fingers according to some aspects.

Relative power level vector $s=[s_1\ldots s_L]$ gives the relative power levels of each l-th main finger to the main finger with the highest power level, where the highest main finger is identified with i=1 and therefore $s_1=1$ and $s_l\leq 1$, l=2, . . . , L. FIG. 6 shows radiation pattern 600 illustrating $s_1$ and $s_2$, where $s_2$ is given by the ratio of the power level of the main finger with the highest power level to the desired power level of the l=2 finger.

Initial complex beamforming weight vector $w^{(0)}\in\mathbb{C}^{N\times 1}$ gives the initial complex beamforming weights, which may be arbitrarily defined (where $[\cdot]^{(n)}$ denotes the value at the n-th iteration). Initial least-squares weights $C^{(0)}=I$ may be defined as the identity matrix I.

Discrete Fourier Transform (DFT) sub-matrix $A_l$ may be composed of rows selected from the DFT matrix A, with DFT matrix A is given as $$A \in \mathbb{C}^{NO\times N} = \begin{bmatrix} a_1^T \\ \vdots \\ a_k^T \\ \vdots \\ a_{NO}^T \end{bmatrix} = \begin{bmatrix} 1 & e^{j\frac{2\pi}{NO}} & \ldots & e^{j\frac{2\pi(N-1)}{NO}} \\ \vdots & \vdots & \vdots & \vdots \\ 1 & e^{j\frac{2\pi k}{NO}} & \ldots & e^{j\frac{2\pi(N-1)k}{NO}} \\ \vdots & \vdots & \vdots & \vdots \\ 1 & e^{j\frac{2\pi NO}{NO}} & \ldots & e^{j\frac{2\pi(N-1)NO}{NO}} \end{bmatrix} \quad (1)$$

where O is the oversampling ratio and each row k of A is a DFT codeword $$a_k^T = \left[1, e^{j\frac{2\pi k}{NO}},\ldots,e^{j\frac{2\pi(N-1)k}{NO}}\right].$$

DFT matrix A may generally be used to steer the radiation pattern of a given antenna array of N antennas. For example, given a desired steering angle $\theta_d$, the codebook index $$k_d = \left\lfloor \frac{NO}{\lambda} d_a \cos(\theta_d) \right\rfloor$$

identifies the row of A that can be applied as complex beamforming weights to steer an antenna pattern in angular direction $\theta_d$, where $\lfloor \cdot \rfloor$ is the operator to find the closest integer, $d_a$ is the inter-elemental distance for a uniform linear array in terms of wavelength $\lambda$. Accordingly, each row k of A can be utilized to steer the radiation pattern in a different direction, where oversampling ratio O may increase the number of rows in A and thus increase the number of available steering directions by a factor of O.

Given a DFT codeword $a_k^T$ and a complex beamforming weight vector w, the far-field radiation pattern at azimuth angle $\theta_k$ can be calculated as $$d(\theta_k) = a_k^T w \quad (2)$$

Accordingly, after the desired main finger and sidelobe azimuth angles $\theta_m$ and $\theta_s$ are defined, beamforming controller 214 can obtain DFT sub-matrix $A_l$ by identifying the codebook index k for each element of $\theta_m$ and $\theta_s$ and concatenating the corresponding DFT codewords (i.e., rows of A) to form $A_l$. As DFT matrix A may be pre-calculated for a given N, beamforming controller 214 may avoid the calculation of steering codewords for each precise angle of $\theta_m$ and $\theta_s$ and may instead select the rows of A having indices that most closely match the angles of $\theta_m$ and $\theta_s$.

With reference back to FIGS. 4A and 4B, beamforming controller 214 may obtain these inputs at stage 402 in preparation for the calculation of w of inner loop 400, where beamforming controller 214 may be configured to calculate w to obtain the desired power level and direction of the while minimizing the sidelobes. In particular, beamforming controller 214 may iteratively adapt w according to least-squares optimization to converge w towards the optimal complex beamforming weights for the desired radiation pattern.

After obtaining the input parameters at stage 402, beamforming controller 214 may update the iteration count n at stage 404, where n is initially set to n=−1. Beamforming controller 214 may then begin the iterative update to w according to least-squares optimization by calculating $d_m^{(n)}$, $d_s^{(n)}$, and $d^{(n)}$, where $$d_m^{(n)} = \left[ d_{Max} s_1 e^{j \arg(a^H(\theta_{m,1}) w^{(n)})}, \ldots, d_{Max} s_L e^{j \arg(a^H(\theta_{m,L}) w^{(n)})} \right]^T \quad (3)$$

$$d_s^{(n)} = s_{Max} \left[ e^{j \arg(a^H(\theta_{s,1}) w^{(n)})}, \ldots, e^{j \arg(a^H(\theta_{s,K}) w^{(n)})} \right]^T \text{ and}$$

$$d^{(n)} = \left[ (d_m^{(n)})^T, (d_s^{(n)})^T \right]^T \quad (4)$$

Vectors $d_m^{(n)}$ and $d_s^{(n)}$ therefore give the desired radiation pattern for each of the main fingers and sidelobes, respectively, where each l-th element of $d_m^{(n)}$ gives the complex amplitude and phase of the l-th main finger according to the current maximum main finger power level $d_{Max}$, and each k-th element of $d_s^{(n)}$ gives the complex amplitude and phase of the k-th sidelobe according to the current maximum sidelobe power level $s_{Max}$. After calculating $d_m^{(n)}$ and $d_s^{(n)}$, beamforming controller 214 may then concatenate $d_m^{(n)}$ and $d_s^{(n)}$ to obtain matrix $d^{(n)}$.

Matrix $d^{(n)}$ therefore represents the power levels of the entire desired radiation pattern over all main finger and sidelobe azimuth angles. Beamforming controller 214 may then utilize least-squares optimization to update w such that the actual radiation pattern (i.e., the radiation pattern that would be produced if w was used at antenna array 202; this does not necessarily include physically using w to actually produce the actual radiation pattern) converges to $d^{(n)}$. In particular, beamforming controller 214 may then calculate $L^{(n)}$, $R^{(n)}$, and $q^{(n)}$ in stage 406 to define the least-square problem for the current iteration n, where $$L^{(n)}(i,j) = \begin{cases} \cos(\arg w_k^{(n)}), & i = j = k \\ \sin(\arg w_k^{(n)}), & i = k, j = k + N \\ 0 & \text{otherwise} \end{cases} \quad (5)$$

$$R^{(n)} = \begin{bmatrix} \text{Re}\{A_l C^{(n)} A_l^H\} & -\text{Im}\{A_l C^{(n)} A_l^H\} \\ \text{Im}\{A_l C^{(n)} A_l^H\} & \text{Re}\{A_l C^{(n)} A_l^H\} \end{bmatrix} \text{ and} \quad (6)$$

$$q^{(n)} = \left[ \text{Re}\{A_l C^{(n)} d^{(n)}\} \quad \text{Im}\{A_l C^{(n)} d^{(n)}\} \right]^T \quad (7)$$

After calculation of $L^{(n)}$, $R^{(n)}$, and $q^{(n)}$ in stage 408, beamforming controller 214 may in stage 410 solve for x in the matrix system $$\begin{bmatrix} x \\ z \end{bmatrix} = \begin{bmatrix} R^{(n)} & L^{(n)T} \\ L^{(n)} & 0 \end{bmatrix}^\dagger \begin{bmatrix} q^{(n)} \\ 1 \end{bmatrix} \quad (8)$$

where $[\cdot]^\dagger$ gives the pseudo-inverse. Equation (8) therefore defines the least-squares problem which beamforming controller 214 can solve to obtain x and subsequently generate w.

The length 2N vector x calculated by beamforming controller 214 via solution of Equation (8) in stage 410 represents the real and imaginary parts of $w^{(n+1)}$ (the updated complex beamforming weights). Accordingly, beamforming controller 214 may calculate $w^{(n+1)}$ from x in stage 412 by calculating $$w^{(n+1)} = e^{j(\{x\}_1^N + j\{x\}_{N+1}^{2N})} \quad (9)$$

As expressed in Equation (8), beamforming controller 214 may therefore generate a new length N vector by taking the first N elements of x as the real part of each element and the second N elements of x as the imaginary part of each element, and subsequently generating each of the N elements of $w^{(n+1)}$ by taking the complex exponential of each element of the new vector.

Accordingly, the resulting elements of $w^{(n+1)}$ may be phase-only, or, in other words, each element $w_n$ of $w^{(n+1)}$ is constrained by $|w_n|=1$. Equivalently, this means that each point $w_n$ is on the unit circle, and thus that beamforming controller 214 may solve for $w^{(n+1)}$ by calculating the optimal points on the unit circle for each $w_n$. However, as this problem is non-convex and thus complex to solve, in some aspects beamforming controller 214 may simplify the problem via a linear approximation as defined by the matrix $L^{(n)}$ in Equation (5). In particular, as opposed to solving for each $w_n$ along the unit circle, beamforming controller 214 may utilize the domain specified by $L^{(n)}$ to define the tangent line along each point $w_n$ on the unit circle, and then solve the least-squares problem along this tangent line (e.g., a linear solution as opposed to solving on the unit circle). After finding the solution along the tangent line (e.g., a point along the tangent line), beamforming controller 214 may then find the closest point on the unit circle and take this point as the new $w_n$. This may enable beamforming controller 214 to solve the least-squares problem in polynomial time, thus rendering certain aspects suitable for adaptive beamforming uses.

Figure 7A:
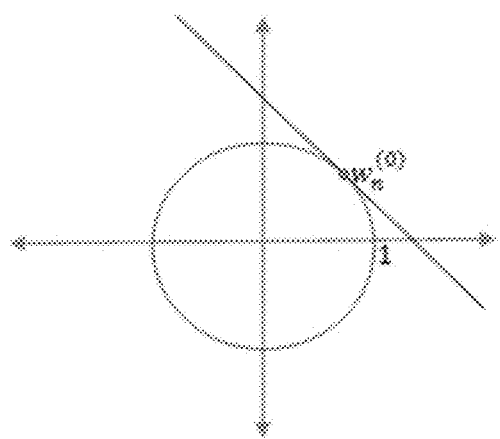
FIGS. 7A and 7B show an illustrative example of solving a least-squares problem for phase-only complex beamforming weights according to some aspects.
Figure 7B:
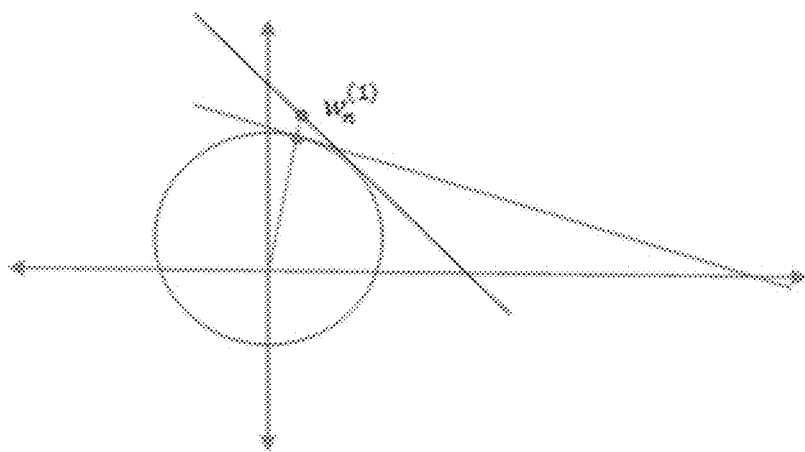

FIGS. 7A and 7B illustrate this computation, in which FIG. 7A shows a given $w_n^{(0)}$ (the initial $w_n$). In calculating $L^{(n)}$, beamforming controller 214 may define the tangent line along the unit circle at $w_n^{(0)}$. As shown in FIG. 7B, beamforming controller 214 may then solve for $w_n^{(1)}$ by finding the least-squares solution along the tangent line and then finding $w_n^{(1)}$ as the closest point on the unit circle to the point found along the tangent line. The solution mathematically expressed for stages 406-412 in Equations (3)-(9) therefore defines such a solution, where beamforming controller 214 may solve for x in Equation (8) to find the linear solution on the tangent line and then calculate $w^{(n+1)}$ as the complex exponential (in other words, on the unit circle) term of x in Equation (9) to find the closest point on the unit circle. Beamforming controller 214 may store the obtained $w^{(n+1)}$ as the solution w* in stage 414.

As the matrix system of Equation (8) is a matrix representation of the least-squares problem, in solving for x and calculating $w^{(n+1)}$, beamforming controller 214 may obtain complex beamforming weights $w^{(n+1)}$ that, when applied at antenna array 202, approaches the optimal w for the desired multi-finger radiation pattern. As previously indicated, in some aspects beamforming controller 214 may solve for w in an iterative manner, where beamforming controller 214 calculates iterative updates to w until w converges sufficiently close to the optimal w. Accordingly, following calculation of $w^{(n+1)}$ in stage 412 beamforming controller 214 may proceed to calculate the least-squares weights $C^{(n+1)}$ for the next iteration in stages 416-420 and to check whether a convergence criterion for w has been satisfied in stages 422-424.

In particular, beamforming controller 214 may calculate the least-square weights $C_{ll}^{(n+1)}$ for the main fingers in stage 416 and calculate the least-square weights $C_{L+k,L+k}^{(n+1)}$ for the sidelobes in stage 418, where $$C_{ll}^{(n+1)} \|a^H(\theta_{m,l})w^{(n+1)}\| - d_{m,l}^{(n)}|, \ l=1,\ldots,L \quad (10)$$

$$C_{L+k,L+k}^{(n+1)} = \max\{\|a^H(\theta_{s,k})w^{(n+1)}\| - d_{s,k}^{(n)}|,0\}, \ k=1,\ldots,K \quad (11)$$

Beamforming controller 214 may the normalize the least-square weights $C^{(n+1)}$ in stage 420 as $$C^{(n+1)} \leftarrow \frac{C^{(n+1)}}{\|C^{(n+1)}\|} \quad (12)$$

Beamforming controller 214 may utilize the least-square weights $C^{(n)}$ in the calculation of $q^{(n)}$ and $R^{(n)}$ in stage 408 and in calculating the error in stage 422, where the least-square weights $C^{(n)}$ is a diagonal matrix that dictates how much emphasis is placed on each main finger or sidelobe when adapting $w^{(n)}$ during each iteration. For example, if the actual radiation pattern $a^H(\theta_{m,l})w^{(n+1)}$ for a given main finger l is close to the desired radiation pattern $d_{m,l}^{(n)}$, the corresponding weight of $C^{(n)}$ for the main finger l will be low-valued and thus the update to $w^{(n)}$ in the next iteration will not place a large emphasis on adapting $w^{(n)}$ to shape the radiation pattern for the main finger l. Conversely, if the actual radiation pattern $a^H(\theta_{m,l})w^{(n+1)}$ for a given main finger l is far from the desired radiation pattern $d_{m,l}^{(n)}$, the corresponding weight of $C^{(n)}$ for the main finger l will be high-valued and the update to $w^{(n)}$ will place a large emphasis on adapting $w^{(n)}$ to shape the radiation pattern for the main finger l. Accordingly, as shown by Equation (10), beamforming controller 214 may calculate the least-square weights $C_{ll}^{(n+1)}$ for the main fingers based on the difference between the actual radiation pattern $a^H(\theta_{m,l})w^{(n+1)}$ and the desired main finger radiation pattern $d_{m,l}^{(n)}$, where larger differences will produce larger least-square weights and thus prompt larger adaptations targeting certain main fingers in the next iteration. In terms of sidelobes, beamforming controller 214 may calculate the least-square weights $C_{L+k,L+k}^{(n+1)}$ for the sidelobes based on the maximum of either a) the difference between the actual radiation pattern $a^H(\theta_{s,k})w^{(n+1)}$ and the desired sidelobe radiation pattern $d_{s,k}^{(n)}$, zero. As beamforming controller 214 is targeting minimization of the sidelobe power level below the maximum sidelobe power level $s_{Max}$, beamforming controller 214 may therefore be configured to set the least-square weights of $C^{(n)}$ to zero for sidelobes that already have a power level below the maximum sidelobe power level $s_{Max}$, meaning that the update to $w^{(n)}$ in the next iteration will not place an emphasis on adapting $w^{(n)}$ to shape the radiation pattern for these sidelobes. Beamforming controller 214 may then utilize the resulting least-square weights $C^{(n+1)}$, after normalization in stage 408, in solving for w in the next iteration.

In some aspects, beamforming controller 214 may be configured to execute inner loop 400 until w satisfies a convergence criterion. Accordingly, in stage 422 beamforming controller 214 may calculate the error term e (n+1) for the current iteration as $$e(n+1) = (w^{(n+1)})^H R^{(n)} w^{(n+1)} - 2(q^{(n)})^H w^{(n+1)} + (d^{(n)})^H C^{(n)} d^{(n)} \quad (13)$$

where $e(0) = \infty$.

After calculating e(n+1) in stage 422, beamforming controller 214 may compare e(n+1) with e(n) in stage 424 as $$|e(n) - e(n-1)| > \epsilon \quad (14)$$

where $\epsilon$ is a predefined convergence parameter.

Accordingly, beamforming controller 214 may determine whether difference between the error term e(n+1) (for the current iteration) and e(n) (for the previous iteration) is greater than $\epsilon$. If yes, this indicates that w has not yet converged sufficiently close to the optimal complex beamforming weights for the desired radiation pattern $d^{(n)}$, and beamforming controller 214 may proceed to stage 404 to perform another iteration of inner loop 400. If no, this indicates that w has converged sufficiently close to the optimal complex beamforming weights, and beamforming controller 214 may proceed to stage 426 to conclude execution of inner loop 400. As beamforming controller 214 stores $W^{(n+1)}$ for the current iteration as w* at stage 414, w* gives the converged complex beamforming weights at the completion of inner loop 400. Alternatively, in some aspects beamforming controller 214 may run inner loop 400 for a predetermined number of iterations and take the value of $W^{(n+1)}$ in the final iteration as w*, which may avoid excessively long runtimes and endless loops.

Completion inner loop 400 until the convergence condition of stage 424 is reached therefore generates complex beamforming weights w that are optimized according to least-squares to produce a desired multi-finger radiation pattern represented by $d^{(n)}$. As can be seen from Equations (3) and (4), $d^{(n)}$, which is derived directly from input parameters $\theta_s$ (sidelobe azimuth angles), $\theta_d$ (main finger azimuth angles), and s (relative main finger power levels), gives the azimuth angles and relative power levels of the main fingers but does not specify the maximum main finger power level $d_{Max}$ and the maximum sidelobe power level $s_{Max}$. As the best achievable maximum main finger power level $d_{Max}$ (e.g., the highest possible maximum main finger power level $d_{Max}$) and maximum sidelobe power level $s_{Max}$ (e.g., the lowest possible maximum sidelobe power level $s_{Max}$) are not initially known for the desired multi-finger radiation pattern, beamforming controller 214 may also iteratively calculate $d_{Max}$ and $s_{Max}$ according to outer loop 500 of FIGS. 5A and 5B. As shown in FIGS. 5A and 5B, beamforming controller 502 may solve inner loop 400 at stage 504, thus obtaining complex beamforming weights w*. As different values for $d_{Max}$ and $s_{Max}$ are achievable for different complex beamforming weights w*, beamforming controller 214 may utilize w* as obtained from inner loop 400 to calculate an update to $d_{Max}$ or $s_{Max}$.

In particular, in stage 502 beamforming controller 214 initialize $d_{Max}$ as $\sqrt{N}$, which is the theoretical maximum gain level for N antennas and thus represents the highest achievable main finger gain level. Beamforming controller 214 may initialize $s_{Max}$ to some arbitrary sidelobe level in stage 502, such as −17 dB below $d_{Max}$.

Beamforming controller 214 may then solve inner loop 400 in stage 504 to obtain w*. After obtaining w*, beamforming controller 214 may calculate error terms $\Delta d_{Max}$ and $\Delta s_{Max}$ as $$\Delta d_{Max} = \max\{||a^H(\theta_{m,l})w^*|-d^*_{m,l}|, \ l=1, \ldots, L\}$$

$$\Delta s_{Max} = \max\{\max\{|a^H(\theta_{s,k})w^*|-d^*_{s,k}, 0\}, \ k=1, \ldots, K\} \quad (15)$$

where $\Delta d_{Max}$ and $\Delta s_{Max}$ are accordingly based on the difference between the actual radiation pattern and the desired radiation pattern represented by $d^*_m$ and $d^*_s$ (which depend on $d_{Max}$ and $s_{Max}$ as specified in Equation (3)).

Higher values for $\Delta d_{Max}$ indicate that the actual radiation pattern according to w* for the main fingers is much less than the desired radiation pattern represented by $d^*_m$. Similarly, higher values for $\Delta s_{Max}$ indicate that the actual radiation pattern according to w* for the sidelobes is much greater than the desired radiation pattern represented by $d^*_s$. Beamforming controller 214 may therefore determine whether both $\Delta d_{Max}$ and $\Delta s_{Max}$ are less than ε in stage 508, where ε is a predefined convergence parameter (or, alternatively, beamforming controller 214 may run outer loop 500 for a predefined number of iterations). If $\Delta d_{Max}$ and $\Delta s_{Max}$ are not both less than ε, beamforming controller 214 may proceed to stage 512 to determine whether $\Delta d_{Max}$ is greater than $\Delta s_{Max}$. If $\Delta d_{Max}$ is greater than $\Delta s_{Max}$, beamforming controller 214 may subtract δ from $d_{Max}$ in stage 514, where δ is a predefined update parameter. Conversely, if $\Delta d_{Max}$ is not greater than $\Delta s_{Max}$, beamforming controller 214 may add δ to $s_{Max}$ in stage 514 (although in some aspects, two different update parameters δ may be used to respectively update $d_{Max}$ and $s_{Max}$). In some aspects, beamforming controller 214 may numerically add δ to $d_{Max}$ or $s_{Max}$, while in other aspects beamforming controller 214 may utilize a lookup table having a predefined set of values for $d_{Max}$ and $s_{Max}$ (e.g., spaced apart by δ or another fixed spacing scheme) which beamforming controller 214 may increment and decrement through when $d_{Max}$ or $s_{Max}$ is to be updated in stage 514 or 516.

After updating one of $d_{Max}$ or $s_{Max}$ in stage 514 or 516, beamforming controller 214 may return to stage 504 to solve inner loop 400 again using the newly updated $d_{Max}$ or $s_{Max}$ value. Solution of inner loop 400 will then produce a new w*, which beamforming controller 214 may utilize again to evaluate $\Delta d_{Max}$ and $\Delta s_{Max}$ as part of outer loop 500.

$\Delta d_{Max}$ and $\Delta s_{Max}$ may eventually converge to the point that both $\Delta d_{Max}$ and $\Delta s_{Max}$ are less than ε. Beamforming controller 214 may identify this condition in stage 508 (i.e., that the maximum of $\Delta d_{Max}$ and $\Delta s_{Max}$ is less than ε), and may then end outer loop 500 at stage 510.

Figure 8:
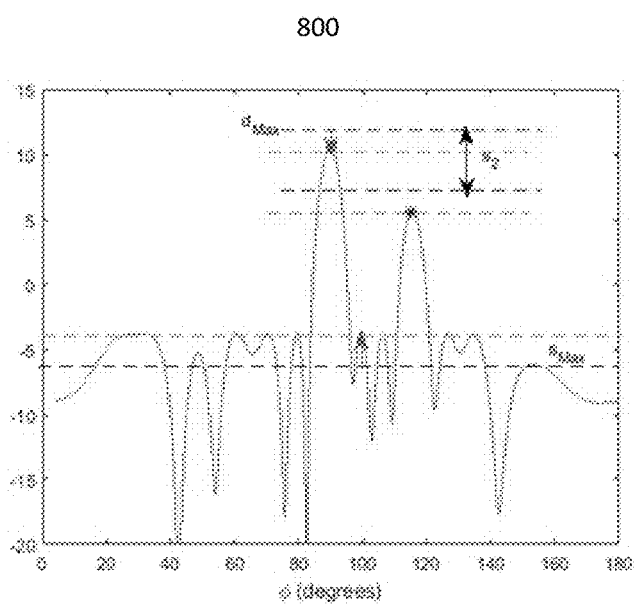
FIG. 8 shows an illustrative example of updating a maximum main finger power level and a maximum sidelobe power level according to some aspects.

Accordingly, beamforming controller 214 may update either $d_{Max}$ or $s_{Max}$ during each iteration of outer loop 500, and may determine which of $d_{Max}$ or $s_{Max}$ to update based on whether a) the maximum difference between the actual and desired main finger radiation patterns, or b) the maximum difference between the actual and desired sidelobe radiation patterns, is larger. FIG. 8 shows radiation pattern 800 illustrating the outer loop updates to $d_{Max}$ and $s_{Max}$. As previously indicated, different values of $f_{Max}$ and $s_{Mac}$ are possible depending on the complex beamforming weights w*. Accordingly, some instances of w* will allow for higher maximum main finger power levels than other instances of w*, while some instances of w* will allow for lower maximum sidelobe power levels than other instances of w*. If beamforming controller 214 calculates a $\Delta d_{Max}$ that is high in stage 506, this can indicate that the current selection of $d_{Max}$ is too high for the current w*, and thus that $d_{Max}$ should be decreased. Similarly, if beamforming controller 214 calculates a $\Delta s_{Max}$ that is high in stage 506, this can indicate that the current selection of $s_{Max}$ is too low for the current w*, and thus that $s_{Max}$ should be increased. Radiation pattern 800 thus shows exemplary updates where beamforming controller 214 decreases $d_{Max}$ by δ and increases $s_{Max}$ by δ. While decreasing $d_{Max}$ by δ will decrease the power level of the main finger with the highest power level, the relative main finger power levels s remain the same, and accordingly the ratio between the main fingers defined by s remains constant.

Beamforming controller 214 may therefore continually execute inner loop 400 and outer loop 500 in such a manner, where beamforming controller iteratively solves inner loop 400 until convergence during each iteration of outer loop 500. Beamforming controller 214 then uses the complex beamforming weights w* obtained as the output of inner loop 400 to update $d_{Max}$ and $s_{Max}$ as part of outer loop 500, and repeats execution of inner loop 400 with the resulting $d_{Max}$ and $s_{Max}$. Beamforming controller 214 may then continue in this manner until $d_{Max}$ and $s_{Max}$ converge. Beamforming controller 214 may thus obtain complex beamforming weights w* that produce the desired multi-finger radiation pattern when implemented at antenna array 202.

In addition to the algorithmic flow illustrated in FIGS. 4 and 5, in some aspects beamforming controller 214 may execute the multi-finger beamforming techniques (as program code or as digitally configured hardware) according to the following pseudocode:

---

Algorithm for Phase-only Multi-finger Synthesis:

Input: Total number of antennas N, azimuth angles for sidelobes $\theta_{s,k}$, k = 1, ..., K, azimuth angles for main beams (fingers) $\theta_{m,l}$, l = 1, ..., L, relative main finger power levels s = [$s_1 \ldots s_L$] with $s_1 = 1$, $d_{Max} = \sqrt{N}$, and $w^{(0)} \in \mathbb{C}^{N \times 1}$ initial Algorithm for Phase-only Multi-finger Synthesis:

phase values (arbitrary), least-square weights $C^{(0)} = I$, $e(0) = \infty$, $A_l \leftarrow$
$[a(\theta_{m,1}), \ldots, a(\theta_{m,L}), a(\theta_{s,1}), \ldots, a(\theta_{s,K})]$
do {
  if $\Delta d_{Max} > \Delta s_{Max}$;
    $d_{Max} \leftarrow d_{Max} - \delta$
  else;
    $s_{Max} \leftarrow s_{Max} + \delta$
  $C^{(0)} = I$, $n = 0$;
  do{

$$d_m^{(n)} = \left[d_{Max} s_1 e^{j \arg(a^H(\theta_{m,1}) w^{(n)})}, \ldots, d_{Max} s_L e^{j \arg(a^H(\theta_{m,L}) w^{(n)})}\right]^T,$$

$$d_s^{(n)} = s_{Max}\left[e^{j \arg(a^H(\theta_{s,1}) w^{(n)})}, \ldots, e^{j \arg(a^H(\theta_{s,K}) w^{(n)})}\right]^T,$$

$$d^{(n)} = \left[(d_m^{(n)})^T, (d_s^{(n)})^T\right]^T,$$

$$L^{(n)}(i,j) = \begin{cases} \cos(\arg w_k^{(n)}), & i = j = k \\ \sin(\arg w_k^{(n)}), & i = k, j = k + N; \\ 0, & \text{otherwise} \end{cases}$$

$$R^{(n)} = \begin{bmatrix} \text{Re}\{A_l C^{(n)} A_l^H\} & -\text{Im}\{A_l C^{(n)} A_l^H\} \\ \text{Im}\{A_l C^{(n)} A_l^H\} & \text{Re}\{A_l C^{(n)} A_l^H\} \end{bmatrix}$$

$$q^{(n)} = [\text{Re}\{A_l C^{(n)} d^{(n)}\} \; \text{Im}\{A_l C^{(n)} d^{(n)}\}]^T$$

$$x = \begin{bmatrix} R^{(n)} & L^{(n)T} \\ L^{(n)} & 0 \end{bmatrix}^\dagger \begin{bmatrix} q^{(n)} \\ 1 \end{bmatrix}$$

$$w^{(n+1)} = e^{j(\{x\}_1^N + j\{x\}_{N+1}^{2N})},$$

$$C^{(n+1)}(i,i) = \begin{cases} \max\{|a^H(\theta_{s,k}) w^{(n+1)}| - d_{s,k}^{(n)}, 0\}, & i = L+1, \ldots, L+K \\ ||a^H(\theta_{m,l}) w^{(n+1)}| - d_{m,l}^{(n)}|, & i = 1, \ldots, L \end{cases},$$

$$e(n+1) \leftarrow (w^{(n+1)})^H R^{(n)} w^{(n+1)} - 2(q^{(n)})^H w^{(n+1)} + (d^{(n)})^H C^{(n)} d^{(n)}$$

$$C^{(n+1)} \leftarrow \frac{C^{(n+1)}}{\|C^{(n+1)}\|}$$

$n \leftarrow n + 1$
  }while $\{|e(n+1) - e(n)| > \epsilon\}$
  $\Delta d_{Max} = \max\{||a^H(\theta_{m,l}) w^{(n+1)}| - d_{m,l}^{(n)}|, l = 1, \ldots, L\}$,
  $\Delta s_{Max} = \max\{\max\{|a^H(\theta_{s,k}) w^{(n+1)}| - d_{s,k}^{(n)}, 0\}, k = 1, \ldots, K\}$,
}while $\{\max\{\Delta d_{Max}, \Delta S_{Max}\} > \epsilon\}$ Accordingly, as previously indicated in some aspects beamforming controller 214 may be implemented as one or more processors configured to retrieve (e.g., from a non-transitory computer readable medium) and execute program code that defines the algorithmic logic detailed herein for multi-finger beamforming. In some aspects, beamforming controller 214 may include digital hardware circuitry that is digitally configured with equivalent arithmetic logic with which beamforming controller 214 can execute part or all of the algorithmic logic detailed herein.

In various aspects, beamforming controller 214 (or another offline processor or processing component) may be configured to perform multi-finger beamforming when operating in an offline manner, e.g., when 200communication device 200 is not actively transmitting or receiving with any users. For instance, beamforming controller 214 may generate a predefined set of complex beamforming weight vectors (e.g., forming a codebook $\mathcal{W} \in \{w_1, w_2, \ldots, w_P\}$, where P is the codebook size and each $w_p$, $p=1, \ldots, P$, is a different codeword of length N), each based on a different desired multi-finger radiation pattern, while operating offline. Once operating online (e.g., during runtime and/or when 200communication device 200 is actively transmitting or receiving with users), beamforming controller 214 may select a complex beamforming weight vector w from $\mathcal{W}$ having an appropriate radiation pattern (e.g., based on user positioning/angular direction relative to antenna array 202) and apply the complex beamforming weight vector to transmit and/or receive at antenna array 202. Accordingly, while beamforming controller 200200 (or another offline processor or processing component) may generate the complex beamforming weight vectors using multi-finger beamforming while offline, beamforming controller 200200 may utilize the resulting complex beamforming weight vectors when operating online.

In some aspects, beamforming controller 214 may be configured to perform multi-finger beamforming online, e.g., when 200communication device 200 is actively transmitting or receiving with one or more users. For example, beamforming controller 214 may identify the angular direction of L users from antenna array 202 (e.g., based on Angle-of-Arrival or similar processing techniques) and may generate main finger azimuth angles $\theta_m$ to include $\theta_{m,l}$= 1, ..., L, where each $\theta_{m,l}$ gives the angular direction of one of the L users. In some aspects, beamforming controller 214 may also identify the distance of the L users from antenna array 202 (e.g., based on received signal strength or transmission timing processing) and generate relative main finger power levels s to include $s_l$, l=1, ..., L, where each $s_l$ is directly proportional to how far each user is from antenna array 202. Beamforming controller 214 may also generate sidelobe azimuth angles $\theta_s$ based on the remaining azimuth angles around those in $\theta_m$ (excluding transients of the main fingers). Beamforming controller 214 may then execute multi-finger beamforming according to inner loop 400 and outer loop 500 to obtain complex beamforming weights w* that approach the optimal complex beamforming weights for the multi-finger radiation pattern defined by $\theta_s$, $\theta_m$, and s.

In some aspects, beamforming controller 214 may repeatedly trigger multi-finger beamforming to obtain repeated updated complex beamforming weights w* when operating online, such as in part of an adaptive beamforming approach. For example, beamforming controller 214 may periodically determine the angular directions and distances of L users (where L may also increase and decrease based on how many users are within the coverage area of 200communication device 200), such as by determining angular directions and distances of the users during each scheduling interval. Beamforming controller 214 may then calculate complex beamforming weights w* to use during each scheduling interval based on the current angular direction and distances of the users, where beamforming controller 214 may re-calculate w* each scheduling interval to dynamically adapt to any changes in the angular direction, distance, or number of users.

Figure 9:
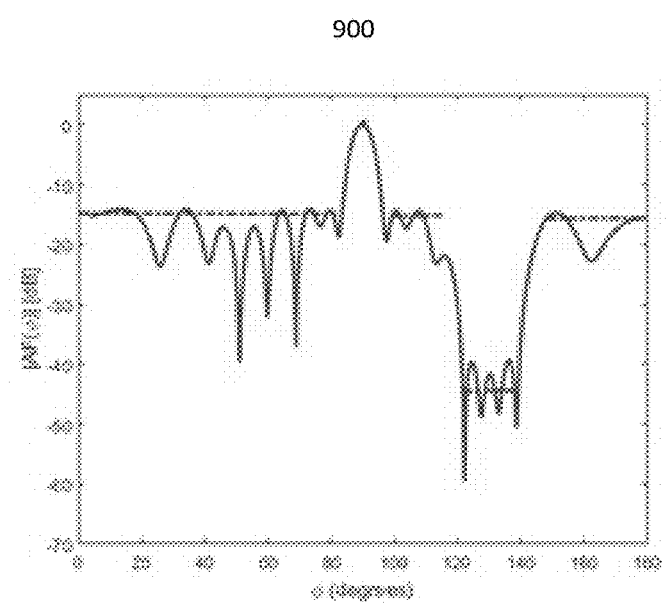
FIG. 9 shows an exemplary radiation pattern for array pattern synthesis according to some aspects.

The multi-finger beamforming techniques can be well-suited for synthesis of radiation patterns having a number of main fingers and a general upper-bound for sidelobes, such as shown in FIGS. 3, 6, and 8. Aspects of this disclosure for array pattern synthesis may enable the generation of more complex patterns having not only main fingers and upper-sidelobe bounds but also null steering, interference suppression, beam broadening, and more precise sidelobe reduction. FIG. 9 shows radiation pattern 900 illustrating an exemplary radiation pattern as generated by aspects of this disclosure for array pattern synthesis. As can be seen from FIG. 9, array pattern synthesis may provide greater control over the radiation pattern and enable the formulation of more complex radiation patterns.

In various aspects, the array pattern synthesis approaches of this disclosure can utilize phase-only control, phase control with amplitude tapering, and phase and amplitude control to generate the desired radiation patterns. As previously detailed, phase-only control approaches involve the use of complex beamforming weights that only invoke phase shifts, for example, complex beamforming weights w constrained by $|w|=1$, such as of the form $w=e^{j\theta}$. Selection of $\theta$ for $w=e^{j\theta}$ thus enables control over phase shifts while the constraint $|w|=1$ prohibits amplitude adjustment.

Phase control with amplitude tapering similarly allows for phase control but constrains the range of amplitude control between an upper-bound and a lower band, for example, complex beamforming weights w constrained by $\alpha \leq |w| \leq 1$, such as in the form $w=\beta e^{j\theta}$ where $\alpha \leq \beta \leq 1$. Accordingly, the amplitude of each complex beamforming weight can be adjusted between some lower bound $\alpha$ and unity gain. Phase and amplitude control enables for both phase control and amplitude control (although there may still be some constraints on the possible range of amplitude control), for example, complex beamforming weights w constrained by $0 \leq |w| \leq 1$, such as in the form $w=\beta e^{j\theta}$ where $0 \leq \beta \leq 1$.

Each of these approaches can be implemented either at baseband or RF. In the baseband case, a beamforming controller such as beamforming controller 214 may specify the appropriate amplitude $\beta$ (with $\beta=1$ for phase-only, $\alpha \leq \beta \leq 1$ for phase control with amplitude tapering, and $0 \leq \beta \leq 1$ for phase and amplitude control) and phase $\theta$ for each complex beamforming weight $w_n$, n=1, ..., N of complex beamforming weight vector $w=[w_1 \ldots w_N]$. Digital signal processor 208 may receive the complex beamforming weights w and apply the complex beamforming weights w to baseband data (e.g., in the case of baseband symbol s in FIG. 1A, e.g. with IQ multiplication) to produce weighted data, which RF transceiver 204 may subsequently transmit with antenna array 202 (in the transmit case) or process to receive transmitted data (in the receive case).

In the RF case, beamforming controller 214 may specify the appropriate amplitude and phase $\theta$ for each complex beamforming weight of w. A set of RF beamforming circuits of RF transceiver 204 (e.g., RF beamforming circuits 110 of FIG. 1B), which may include, for example, analog RF frequency shifters, gain elements, and/or tapering circuits, may receive the complex beamforming weights w and apply the complex beamforming weights w to RF data to produce weighted data, which RF transceiver 204 may subsequently transmit with antenna array 202 (in the transmit case) or process to receive transmitted data (in the receive case).

Similar to $\theta_m$, $\theta_s$, and s in multi-finger beamforming, array pattern synthesis may utilize input parameters that define a desired radiation pattern (e.g., radiation pattern 900) to derive complex beamforming weights w that realize the desired radiation pattern. Additionally, in various aspects the array pattern synthesis approaches of this disclosure may also use least-squares minimization to iteratively solve for an optimal solution for w.

However, the array pattern synthesis approaches may generally utilize a more rigorous algorithm to derive w from the input parameters than as done for multi-finger beamforming as described above. As detailed above regarding FIGS. 5A and 5B, outer loop 500 of the multi-finger beamforming approaches may decide whether to decrease the maximum main finger power level $d_{Max}$ or increase the maximum sidelobe power level $s_{Max}$ during each iteration based on the relative levels of the main fingers and $d_{Max}$ and the relative levels of the sidelobes and $s_{Max}$. Accordingly, the multi-finger beamforming approaches detailed herein may allow the sidelobes to exceed the maximum sidelobe power level, in response to which outer loop 500 may trigger an increase in $s_{Max}$.

However, various aspects of the array pattern synthesis approaches of this disclosure may place constraints on the sidelobes that can prevent the sidelobes from exceeding certain upper-bounds. In other words, array pattern synthesis approaches can iteratively update w while aiming to ensure that any update to w does not allow the sidelobes to exceed certain upper-bounds.

These techniques can allow for greater control over the radiation pattern. However, as the iterative updates to w may face stricter constraints in aiming to keep the sidelobes below upper-bounds, some aspects of the array pattern synthesis approaches may call for more complex algorithmic solutions. In particular, given the constraints on updates to w, the matrix inversion (e.g., pseudoinverse) of Equation (8) and stage 410 may not be possible as the $$\text{matrix}\begin{bmatrix} R^{(n)} & L^{(n)T} \\ L^{(n)} & 0 \end{bmatrix}$$

may not be invertible.

Accordingly, instead of applying least-squares optimization over the azimuth angles for all main fingers and sidelobes as in the case of multi-finger beamforming, aspects of array pattern synthesis in this disclosure may separate the azimuth angles into two groups: a first group $\theta_l$ with azimuth angles that are subject to the least-squares constraint, and a second group $\theta_p$ with azimuth angles that are subject to the upper-bound constraint. As the upper-bound constraint may only be directed to sidelobes (as sidelobes are intended to be minimized while main fingers are intended to be maximized), the second group $\theta_p$ may only contain sidelobe azimuth angles, while the first group $\theta_l$ may contain main finger and/or sidelobe azimuth angles. Depending on the relative power level of each sidelobe in each iteration, the array pattern synthesis approaches may switch azimuth angles for certain sidelobes from the first group $\theta_l$ to the second group $\theta_p$.

The desired radiation pattern may be defined as d=[$d_1$ ... $d_K$] (amplitude only) for azimuth angles $\theta_{l,i}$, i=1, ..., K, where $d(\delta_{l,i})$, i=1, ..., K. The least-square problem for the azimuth angles $\theta_{l,i}$ i=1, ..., K can therefore be generalized as finding w where $$\underset{w}{\operatorname{argmin}} \sum_{k=1}^{K} c_k |d_k e^{j\varphi_k} - f(\theta_{l,k}) a^H(\theta_{l,k}) w|^2 \text{ such} \quad (16)$$

$$\text{that } |f(\theta_{l,k}) a^H(\theta_{l,k}) w|^2 \leq P_l, l = 1, \ldots, L$$

$$|w_n| \leq 1, n = 0, \ldots, N-1$$

where $\varphi_k$ gives the phase at the k-th least-squares constraint azimuth angle $\theta_{l,k}$ as $\varphi_k = \arg(a^H(\theta_{l,k})w)$ (because the desired radiation pattern d only gives amplitude, the phase term can also be considered in the least-squares optimization), $f(\theta)$ gives the radiation pattern of the antennas of antenna array 202 (where omnidirectional antennas would have $f(\theta)=1$), and $P_l$, l=1, ..., L gives the upper-bound constraints on the sidelobe azimuth angles in $\theta_l$.

Solution of the least-squares problem defined by Equation (16) is non-convex and NP-hard; however, aspects provided below for phase-only and phase control with amplitude tapering can present convex solutions. Furthermore, aspects provided below also specify how to select least-square weights $c_k$ and $\varphi_k$, and feasible constraints. Therefore, the following aspects of array pattern synthesis can reformulate the above optimization problem for array pattern synthesis to solve it in polynomial time.

Figure 10:
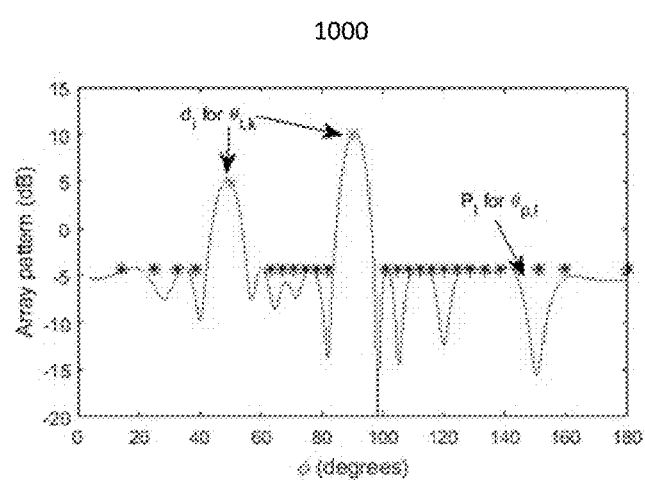
FIG. 10 shows an illustrative example of a target radiation pattern for array pattern synthesis according to some aspects.

FIG. 10 shows an exemplary radiation pattern 1000 illustrating the least-squares constraints on the azimuth angles of $\theta_l$ according to d and the upper-bound constraints on the azimuth angles of $\theta_p$ according to $P_l$. In particular, radiation pattern 1000 illustrates two least-square constraints for azimuth angles $\theta_{l,k}$ defined by $d_i$ and upper-bound constraints on the power level of some azimuth angels $\theta_{p,k}$ for side-lobe reduction.

Figure 11A:
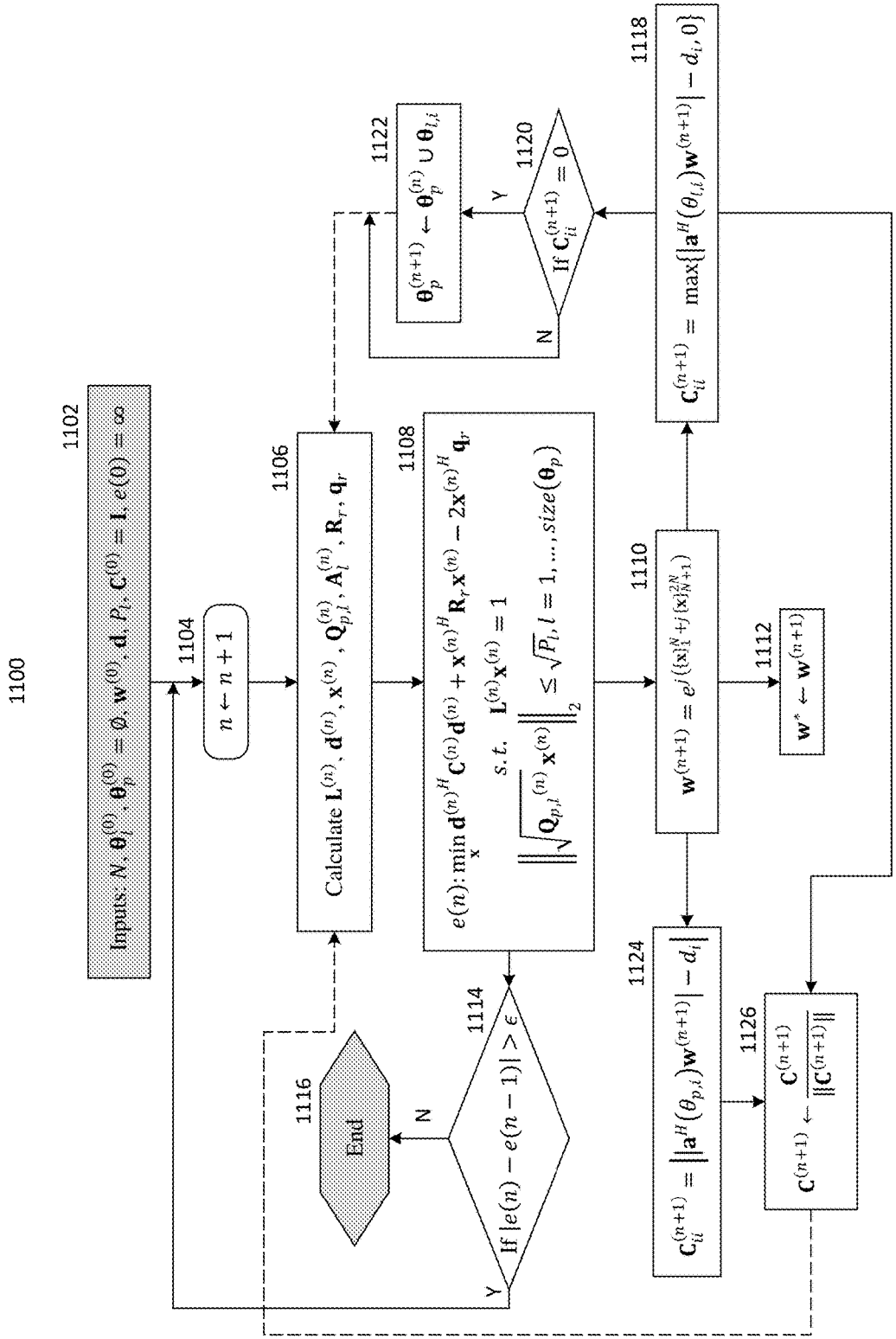
FIGS. 11A and 11B shows an exemplary method of array pattern synthesis for phase-only beamforming according to some aspects.
Figure 11B:
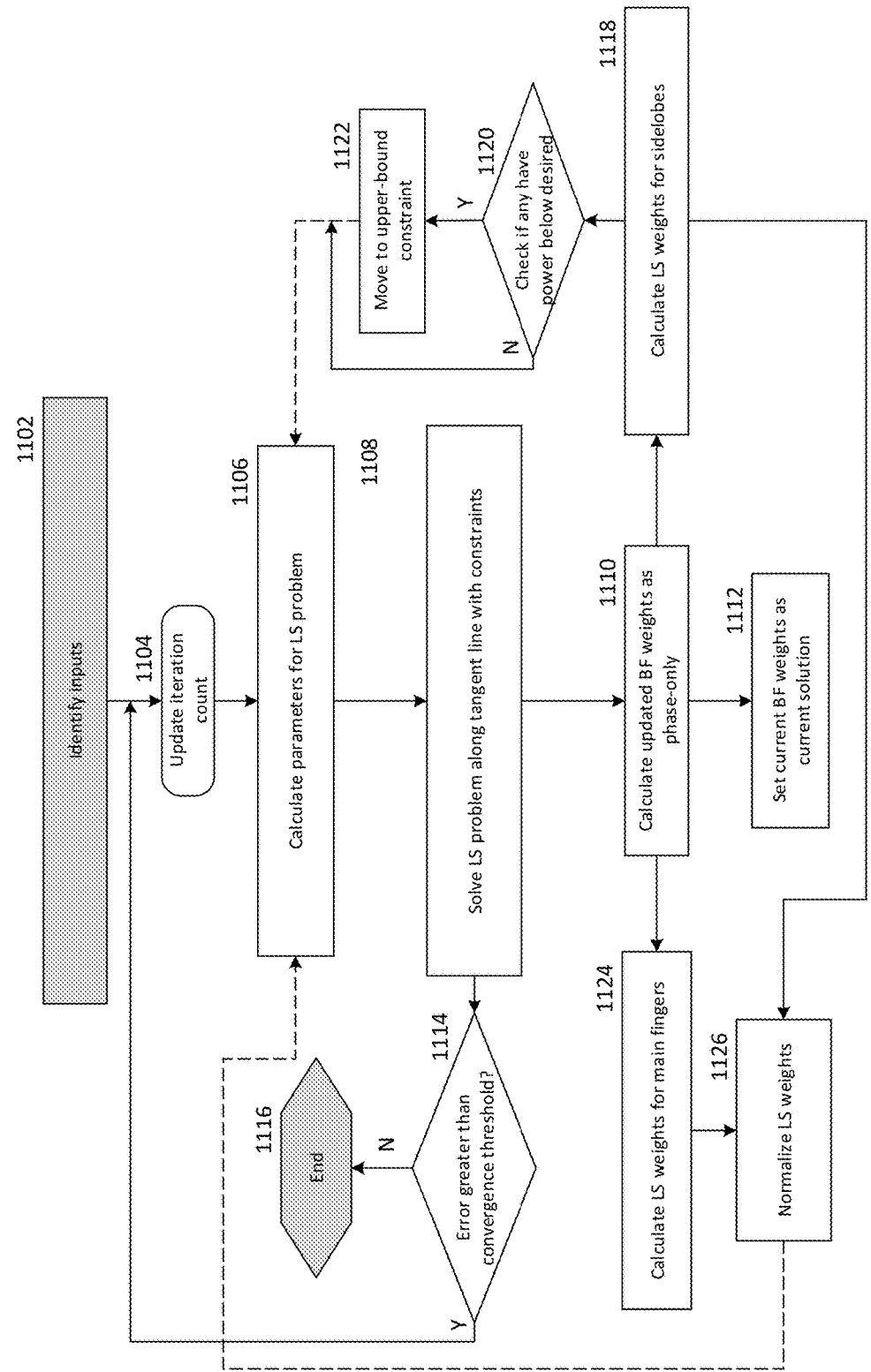

FIGS. 11A and 11B show an exemplary process 1100 for a phase-only array pattern synthesis approach according to some aspects. FIG. 11A expresses process 1100 algorithmically while FIG. 11B expresses process 1100 in prose, where the underlying logic at each stage in both expressions is equivalent. In the manner as detailed above for aspects of multi-finger beamforming, beamforming controller 214 may execute the algorithmic logic of process 1100 as one or more processors executing program code that defines the algorithmic logic and/or one or more dedicated hardware circuits that are digitally configured according to the algorithmic logic.

As shown in FIGS. 11A and 11B, beamforming controller 214 may begin process 1100 with the following inputs at stage 1102:

N number of antennas $\theta_l$ azimuth angles with least-squared constraint $\theta_p$ azimuth angles with upper-bound constraint $w^{(0)}$ initial complex beamforming weights d initial desired radiation pattern $P_l$ upper-bound sidelobe gain $C^{(0)}$ initial least-squares weights e(0) initial error term where $\theta_l$ is a vector $\theta_l = [\theta_{l,1} \ldots \theta_{l,K}]$ containing the azimuth angles $\theta_{l,i}$=1, ..., K, $\theta_p$ is a vector $\theta_p = [\theta_{p,1} \ldots \theta_{p,L}]$ containing the azimuth angles $\theta_{p,i}$, i=1, ..., L, $w^{(0)}$ is a vector $w = [w_0 w_1 \ldots w_{N-1}]^T$ containing the initial complex beamforming weights $w_n$, n=0, ..., N-1 (can be arbitrarily chosen), d is a vector $d = [d_1 \ldots d_K]$ containing the desired radiation pattern for the least-squared constraint azimuth angles $\theta_{l,i}$, i=1, ..., K as $d_i = d(\theta_{l,i})$, i=1, ..., K, $P_l$, l=1, ..., size ($\theta_p$), are the maximum sidelobe power levels for each of the azimuth angles in $\theta_p$ (which are all sidelobe azimuth angles), $C^{(0)}$ is a diagonal matrix initialized to the identity matrix I that gives the initial least-square weights, and e(0)=∞ gives the initial error term used for the convergence check.

As denoted in stage 1102, process 1100 may initialize the second group $\theta_p$ (the upper-bound constraint azimuth angles) as a null set Ø, and accordingly may initialize the first group $\theta_l$ (the least-squares constraint azimuth angles) as containing all of the azimuth angles. Each of the azimuth angles may be pre-identified as either a main finger azimuth angle or a sidelobe azimuth angle. Desired radiation pattern vector d defines the desired power level at each main finger and sidelobe azimuth angle, and therefore acts as the input parameter defining the overall radiation pattern.

Beamforming controller 214 may selectively switch certain sidelobe azimuth angles from the first group $\theta_l$ to the second group $\theta_p$ throughout the course of execution of process 1100. In particular, as soon beamforming controller 214 calculates an iterative update to $w^{(n)}$ that causes the actual radiation pattern for a given sidelobe azimuth angle of $\theta_l$ to fall below its desired radiation pattern, beamforming controller 214 may switch the sidelobe azimuth angle from $\theta_l$ to $\theta_p$, thus changing the sidelobe azimuth angle from being subject to a least-squared constraint to being subject to an upper-bound constraint. Each azimuth angle in $\theta_p$ may therefore be a sidelobe azimuth angle for which the current $w^{(n)}$ keeps the radiation pattern below a certain upper bound, while each azimuth angle in $\theta_l$ may either be a main finger azimuth angle (which may always remain in $\theta_l$ and thus subject to a least-squares constraint) or a sidelobe azimuth angle that $w^{(n)}$ does not yet contain below its upper bound.

As beamforming controller 214 may aim to determine complex beamforming weights w that keep the radiation pattern at sidelobe azimuth angles below certain upper bounds (while realizing main fingers that reach certain maximum power levels), beamforming controller 214 may then calculate subsequent iterative updates to $w^{(n)}$ while ensuring that any update to $w^{(n)}$ does not cause the radiation pattern at any of the azimuth angles in $\theta_p$ (which are all sidelobe azimuth angles) to exceed their assigned upper bounds. Beamforming controller 214 may therefore iteratively solve the least-squares problem for the azimuth angles of $\theta_l$ to determine a $w^{(n)}$ while constraining all updates to $w^{(n)}$ to keep the azimuth angles of $\theta_p$ below their assigned upper bounds.

With reference back to FIGS. 11A and 11B, after obtaining the initial parameters at stage 1102, beamforming controller 214 may increment iteration counter n to n+1 in stage 1104. Beamforming controller 214 may then calculate $L^{(n)}$, $d^{(n)}$, $x^{(n)}$, $Q_{p,l}^{(n)}$, $A_l^{(n)}$, $R_r$, and $q_r$ in stage 1106, which define the least-squares problem in the current iteration.

As previously indicated, beamforming controller 214 may execute process 1100 in accordance with a phase-only approach, where each $w_n$ of w is bound by $|w_n|=1$. Beamforming controller 214 may redefine the least-squares problem generalized above in Equation (8) according to a phase-only approach for process 1100.

In particular, as previously described regarding FIGS. 7A and 7B, each $w_n$ may be a point on the unit circle, and in solving the least-squares problem beamforming controller 214 may aim to find w as a set of points on the unit circle that minimize the least-square error between the actual radiation pattern produced by w and the desired radiation pattern d. Beamforming controller 214 may therefore solve the least-squares problem with process 1100 in the manner as described for multi-finger beamforming in inner loop 400 and outer loop 500, namely by, for each $w_n$ of $w^{(n)}$, plotting the tangent line on the unit circle, solving the least-squares problem in a linear fashion along the tangent line, finding the closest point on the unit circle to the solution on the tangent line, and taking this closest point as the new $w_n$ for $w^{(n+1)}$.

Accordingly, beamforming controller 214 may calculate $L^{(n)}$ in stage 1104 to define the tangent lines for the current $w^{(n)}$, in particular as $$L^{(n)}(i,j) = \begin{cases} \cos(\arg w_k^{(n)}), & i=j=k \\ \sin(\arg w_i^{(n)}), & i=k, j=k+N \\ 0 & \text{otherwise} \end{cases} \quad (17)$$

Beamforming controller 214 may calculate the desired radiation pattern $d^{(n)}$ for the azimuth angles in $\theta_l$ in the current iteration (e.g., for the least-squared constraint azimuth angles) based on the phase values of the radiation pattern produced by the current $w^{(n)}$, in particular as $$d^{(n)} = [d_1 e^{j\varphi_1} \ldots d_{size(\theta_l)} e^{j\varphi_{size(\theta_l)}}]^T \quad (18)$$

where each element $d_i$, $i=1, \ldots, K$ is the desired radiation pattern for the i-th azimuth angle in $\theta_l$ and $\varphi_i = \arg(a^H(\theta_{l,i})w^n)$ gives the phase at the i-th azimuth angle of $\theta_l$ given $w^{(n)}$ as described above regarding Equation (31).

Beamforming controller 214 may calculate $x^{(n)}$ based on the real and imaginary parts of $w^{(n)}$ as $$x^{(n)} = [\text{Re}\{w^{(n)}\} \text{Im}\{w^{(n)}\}]^T \quad (19)$$

Beamforming controller 214 may calculate $Q_{p,l}^{(n)}$ as $$Q_{p,l}^{(n)} = \begin{bmatrix} \text{Re}\{a(\theta_{p,l})a^H(\theta_{p,l})\} & -\text{Im}\{a(\theta_{p,l})a^H(\theta_{p,l})\} \\ \text{Im}\{a(\theta_{p,l})a^H(\theta_{p,l})\} & \text{Re}\{a(\theta_{p,l})a^H(\theta_{p,l})\} \end{bmatrix}, \quad (20)$$

$$l = 1, \ldots, size(\theta_p)$$

where $Q_{p,l}^{(n)}$ represents real matrix of the matrix of azimuth angles with upper-bound constraint for iteration n and constraint l, This is used to solve the problem in real domain.

Beamforming controller 214 may calculate $A_l^{(n)}$ as $$A_l^{(n)} \leftarrow [a(\theta_{l,1}), \ldots, a(\theta_{l,size(\theta_l)})] \quad (21)$$

where, similar to the multi-finger beamforming approach, A is the DFT matrix and $A_l^{(n)}$ therefore gives the DFT-submatrix containing the rows of A having indices that correspond to the azimuth angles of $\theta_l$.

Beamforming controller 214 may calculate $R_r$ as $$R_r = \begin{bmatrix} \text{Re}\{A_l^{(n)}C^{(n)}(A_l^{(n)})^H\} & -\text{Im}\{A_l^{(n)}C^{(n)}(A_l^{(n)})^H\} \\ \text{Im}\{A_l^{(n)}C^{(n)}(A_l^{(n)})^H\} & \text{Re}\{A_l^{(n)}C^{(n)}(A_l^{(n)})^H\} \end{bmatrix} \quad (22)$$

where $R_r$ is a matrix in real domain obtained by expanding the weighted least square objective function in (16). It is used to solve problem in real domain in a convex optimization.

Beamforming controller 214 may calculate $q_r$ as $$q_r = [\text{Re}\{A_l^{(n)}C^{(n)}d^{(n)}\} \text{Im}\{A_l^{(n)}C^{(n)}d^{(n)}\}]^T \quad (23)$$

where $q_r$ is a vector in real domain obtained by expanding the weighted least square objective function in (16). It is used to solve problem in real domain in a convex optimization.

Accordingly, given $L^{(n)}$, $d^{(n)}$, $x^{(n)}$, $Q_{p,l}^{(n)}$, $A_l^{(n)}$, $R_r$, $q_r$, and $C^{(n)}$ (either $C^{(0)}=I$ or $C^{(n>0)}$ as obtained in the previous iteration), beamforming controller 214 may solve the least-squares problem in stage 1108 using phase-only beamforming while considering the upper-bound constraint on the azimuth angles of $\theta_p$. As previously indicated, in order to make the optimization complex, the phase-only constraint $|w_n|=1$ is replaced by a linear constraint as in FIGS. 7A and 7B, where beamforming controller 214 performs the optimization on the tangent line at point $w_n^{(0)}$ for each antenna element of antenna array 202. After solving along the tangent line, beamforming controller 214 finds $w_n^{(1)}$ as the closest point on the unit circle to the solution found on the tangent line. Expressed mathematically, beamforming controller 214 may calculate $$e(n): \min_x d^{(n)H}C^{(n)}d^{(n)} + x^{(n)H}R_r x^{(n)} - 2x^{(n)H}q_r \text{ such that} \quad (24)$$

$$\left\|\sqrt{Q_{p,l}^{(n)}} x^{(n)}\right\|_2 \leq \sqrt{P_l}, l=1, \ldots, size(\theta_p) \quad L^{(n)}x^{(n)} = 1$$

Beamforming controller 214 may therefore solve the least-squares problem with phase-only beamforming by finding the vector x that minimizes the least-squares expression $d^{(n)H}C^{(n)}d^{(n)} + x^{(n)H}R_r x^{(n)} - 2x^{(n)H}q_r$ while also keeping the radiation pattern at the upper-bound constraint azimuth angles of $\theta_p$ below their respective upper bounds given by $P_l$ and constraining the solution to points located on the unit circle. Beamforming controller 214 may also set the error term e(n) as the value of $d^{(n)H}C^{(n)}d^{(n)}+x^{(n)H}R_rx^{(n)}-2x^{(n)H}q_r$ given the identified x, or in other words, the minimum value of $d^{(n)H}C^{(n)}d^{(n)}+x^{(n)H}R_rx^{(n)}-2x^{(n)H}q_r$ that also satisfies the relevant constraints on x.

Following stage 1108, beamforming controller 214 may calculate $w^{(n+1)}$ from x in stage 1110 as $$w^{(n+1)}e^{j(\{x\}_1^N+j\{x\}_{N+1}^N)} \tag{25}$$

which makes $w^{(n+1)}$ have a constant modulus and thus.

Beamforming controller 214 may then set $w^{(n+1)}$ for the current solution as w* in stage 1112. Beamforming controller 214 may then update the least-square weights $C^{(n)}$ and, if necessary, select azimuth angles of $\theta_l$ to switch to $\theta_p$. In particular, beamforming controller 214 may update the least-square weights for the sidelobe azimuth angles in stage 1118 by calculating $$C_{ii}^{(n+1)}=\max\{|a^H(\theta_{l,i})w^{(n+1)}|-d_i,0\} \tag{26}$$

or in other words, by setting $C_{ii}^{(n+1)}$ for each i-th azimuth angle of $\theta_l$ that is a sidelobe as either a) the difference between the magnitude of the actual radiation pattern $|a^H(\theta_{l,i})w^{(n+1)}|$ and the desired radiation pattern $d_i$ for the i-th azimuth angle if the magnitude of the actual radiation pattern is greater than the desired radiation pattern, or b) zero if the magnitude of the actual radiation pattern is not greater than the desired radiation pattern.

Accordingly, the least-square weights $C_{ii}^{(n+1)}$ will be non-zero for sidelobe azimuth angles for which the actual radiation pattern given by $w^{(n+1)}$ is greater than the desired radiation pattern, and will be zero for sidelobe azimuth angles for which the actual radiation pattern given by $w^{(n+1)}$ is greater than the desired radiation pattern. As beamforming controller 214 may aim to keep the radiation pattern for sidelobe azimuth angles below their respective desired radiation pattern, beamforming controller 214 may switch the sidelobe azimuth angles in $\theta_l$ having zero-valued least-square weights $C_{ii}^{(n+1)}$ to $\theta_p$, and constrain subsequent updates to w to keeping the radiation pattern for these sidelobe azimuth angles to below their desired radiation pattern.

Accordingly, beamforming controller 214 may check in stage 1120 whether any of the least-square weights $C_{ii}^{(n+1)}$ for sidelobe azimuth angles are equal to zero and, if so, move the sidelobe azimuth angles with zero-valued least-square weights $C_{ii}^{(n+1)}$ from $\theta_l$ to $\theta_p$ in stage 1122. Beamforming controller 214 may keep the sidelobe azimuth angles with non-zero least-square weights $C_{ii}^{(n+1)}$ in $\theta_l$.

Movement of sidelobe azimuth angles from $\theta_l$ to $\theta_p$ will change the size of the dependent vectors and matrices calculated by beamforming controller 214 in stage 1106, as the number of azimuth angles in $\theta_l$ will decrease and the number of azimuth angles in $\theta_p$ will increase. Beamforming controller 214 may then store current $\theta_l$ and $\theta_p$ for subsequent use in stage 1106 of the next iteration. Beamforming controller 214 will then perform subsequent iterations with different vector and matrix sizes according to the current size of $\theta_l$ and $\theta_p$.

Following stage 1110, beamforming controller 214 may also update the least-square weights $C_{ii}^{(n+1)}$ for the azimuth angles in $\theta_l$, which includes main finger azimuth angles and sidelobe azimuth angles for which $w^n$ does not yet reduce the actual radiation pattern below their desired radiation pattern. Beamforming controller 214 may update the least-square weights $C_{ii}^{(n+1)}$ for the azimuth angles in $\theta_l$ in stage 1124 as $$C_{ii}^{(n+1)}=||a^H(\theta_{p,i})w^{(n+1)}|-d_i| \tag{27}$$

Beamforming controller 214 may then normalize all of the least-square weights of $C^{(n+1)}$ (for both main finger and sidelobe azimuth angles) in stage 1126 as $$C^{(n+1)} \leftarrow \frac{C^{(n+1)}}{\|C^{(n+1)}\|} \tag{28}$$

and subsequently store the least-square weights $C^{(n+1)}$ for subsequent use in stage 1106 of the next iteration.

Beamforming controller 214 may continue to iteratively update w according to process 1100 in this manner. At the end of each iteration n, beamforming controller 214 may check for convergence by comparing the error term e(n) of the current iteration to the error term e(n−1) of the previous iteration, and determining whether the magnitude of the difference is greater than convergence parameter ϵ in stage 1114. If the magnitude of the difference |e(n)−e(n−1)| is greater than E, beamforming controller 214 may conclude that $w^{(n)}$ has not yet converged to the optimal solution and may proceed to the next iteration n+1 at stage 1104. If the magnitude of the difference |e(n)−e(n−1)| is greater than ϵ, beamforming controller 214 may conclude that $w^{(n)}$ has converged and may end process 1100 at stage 1116, thus taking the current $w^{(n)}$ as the final complex beamforming weights w*. Alternatively, beamforming controller 214 may execute process 1100 for a predefined number of iterations, and take the value of $w^{(n+1)}$ at the final iteration as w*.

Equivalent to the arithmetic logic described regarding FIGS. 11A and 11B, beamforming controller 214 may execute process 1100 (as program code or as digitally configured hardware) according to the following pseudocode:

---

Algorithm for Phase-only Array Pattern Synthesis:

Input: Total number of antennas N, azimuth angles $\theta_{l,k} \in \theta_l^{(0)}$, $\theta_{p,l} \in \theta_p^{(0)} = \emptyset$, and $w^{(0)} \in \mathbb{C}^{N \times 1}$ initial phase values (arbitrary), desired raditation pattern $d_i$ for each azimuth angles, power upper bound $P_l$, least-square weights $C^{(0)} = I$. $e(0) = \infty$.

do {

$$L^{(n)}(i, j) = \begin{cases} \cos(\arg w_k^{(n)}), & i = j = k \\ \sin(\arg w_k^{(n)}), & i = k, j = k + N \\ 0, & \text{otherwise} \end{cases}$$

Find: $d^{(n)} = \left[d_1 e^{j\arg(a^H(\theta_{l,1})w^{(n)})}, \ldots, d_{|\theta_l|}e^{j\arg(a^H(\theta_{l,|\theta_l|})w^{(n)})}\right]^T$, $A_l^{(n)} \leftarrow [a(\theta_{l,1}), \ldots, a(\theta_{l,|\theta_l|})]$, -continued Algorithm for Phase-only Array Pattern Synthesis:

$$Q_{p,l}^{(n)} = \begin{bmatrix} \text{Re}\{a(\theta_{p,l})a^H(\theta_{p,l})\} & -\text{Im}\{a(\theta_{p,l})a^H(\theta_{p,l})\} \\ \text{Im}\{a(\theta_{p,l})a^H(\theta_{p,l})\} & \text{Re}\{a(\theta_{p,l})a^H(\theta_{p,l})\} \end{bmatrix}, l = 1, \ldots, |\theta_p|$$

$$R_r = \begin{bmatrix} \text{Re}\{A_l^{(n)}C^{(n)}(A_l^{(n)})^H\} & -\text{Im}\{A_l^{(n)}C^{(n)}(A_l^{(n)})^H\} \\ \text{Im}\{A_l^{(n)}C^{(n)}(A_l^{(n)})^H\} & \text{Re}\{A_l^{(n)}C^{(n)}(A_l^{(n)})^H\} \end{bmatrix}$$

$$q_r = [\text{Re}\{A_l^{(n)}C^{(n)}d^{(n)}\} \; \text{Im}\{A_l^{(n)}C^{(n)}d^{(n)}\}]^T$$
$$x^{(n)} = [\text{Re}\{w^{(n)}\} \; \text{Im}\{w^{(n)}\}]^T$$

Solve:

$$e(n): \min_x \; d^{(n)H}C^{(n)}d^{(n)} + x^{(n)H}R_r x^{(n)} - 2x^{(n)H}q_r$$

s.t. $L^{(n)}x^{(n)} = 1$, $$\left\|\sqrt{Q_{p,l}^{(n)}}\, x^{(n)}\right\|_2 \leq \sqrt{P_l}, l = 1, \ldots, |\theta_p|$$

Figure 12A:
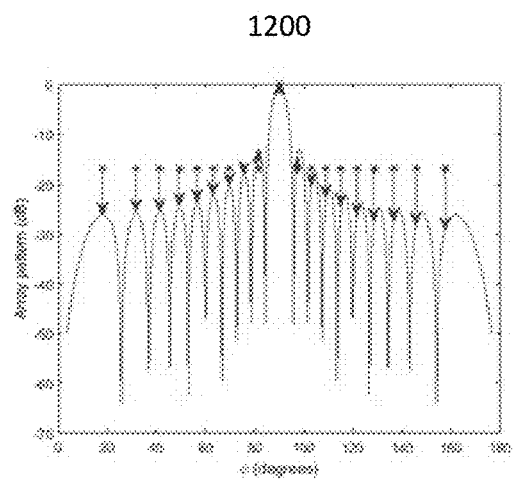
FIGS. 12A-12C show an illustrative example of iteratively solving for phase-only complex beamforming weights for array pattern synthesis according to some aspects.
Figure 12B:
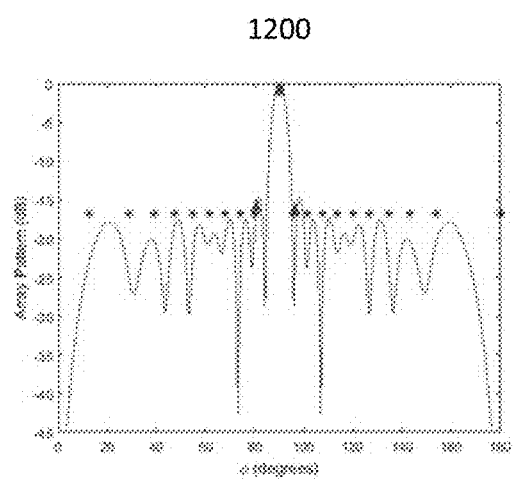
Figure 12C:
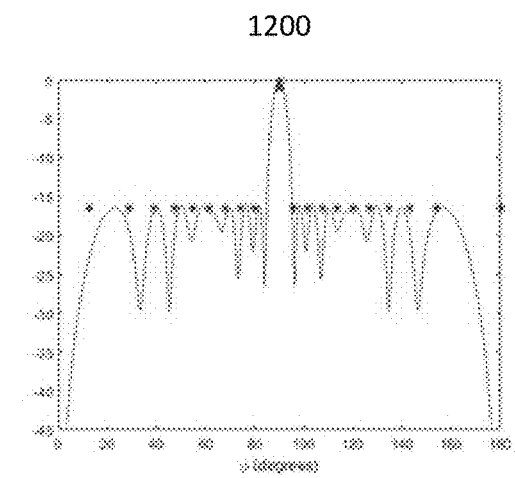

Find:
$$w^{(n+1)} = e^{j(\{x\}_1^N + j\{x\}_{N+1}^{2N})}$$

$$C_{ll}^{(n+1)} = \begin{cases} \max\{|a^H(\theta_{p,l})w^{(n+1)}| - d_l, 0\}, & \text{if sidelobe} \\ ||a^H(\theta_{p,l})w^{(n+1)}| - d_l|, & \text{if main beam} \end{cases}, l = 1, \ldots, |\theta_l|$$

if $C_{ll}^{(n+1)} == 0$, do $\theta_l^{(n+1)} \leftarrow \theta_l^{(n)} \setminus \theta_{l,l}$ and $\theta_p^{(n+1)} \leftarrow \theta_p^{(n)} \cup \theta_{l,l}$ ∀l
Normalize $C^{(n+1)}$
$n \leftarrow n + 1$} while $(|e(n) - e(n-1)| \geq \epsilon)$ FIGS. 12A-12B show the iterative progression of process 1100 according to some aspects, where upward-pointing arrows indicate least-squares constraint azimuth angles in $\theta_l$ and downward-pointing arrows indicate upper-bound constraint azimuth angles in $\theta_p$. As shown in FIG. 12A, the initial radiation pattern produced by $w^{(n)}$ yields two sidelobe azimuth angles that are above their desired radiation pattern given by $d_l$ while the remaining sidelobe azimuth angles are below their desired radiation pattern. Accordingly, upon evaluating the least-square constraints $C^{(n)}$ in stages 1118 and 1120, beamforming controller 214 may move the remaining sidelobe azimuth angles from $\theta_l$ to $\theta_p$ and leave the two sidelobe azimuth angles in $\theta_l$ along with the main finger azimuth angle. Beamforming controller 214 may then solve the least-squares problem for $w^{(n+1)}$ in the next iteration using phase-only beamforming while constraining the azimuth angles of $\theta_p$ to remain below their respective upper-bound power levels $P_l$. Accordingly, as shown in FIG. 12B, beamforming controller 214 may obtain $w^{(n+1)}$ that keeps the radiation pattern for the upper-bound constraint azimuth angles in $\theta_l$ below their respective $P_l$. Beamforming controller 214 may again solve the least-squares problem for $w^{(n+2)}$ to arrive at the radiation pattern shown in FIG. 12C, where all sidelobe azimuth angles are below their respective desired power levels $P_l$ and are thus in $\theta_p$. As beamforming controller 214 may decide that w has converged based on the error term e(n), beamforming controller 214 may continue to iteratively update w after moving all sidelobe azimuth angles to $\theta_p$.

Figure 13A:
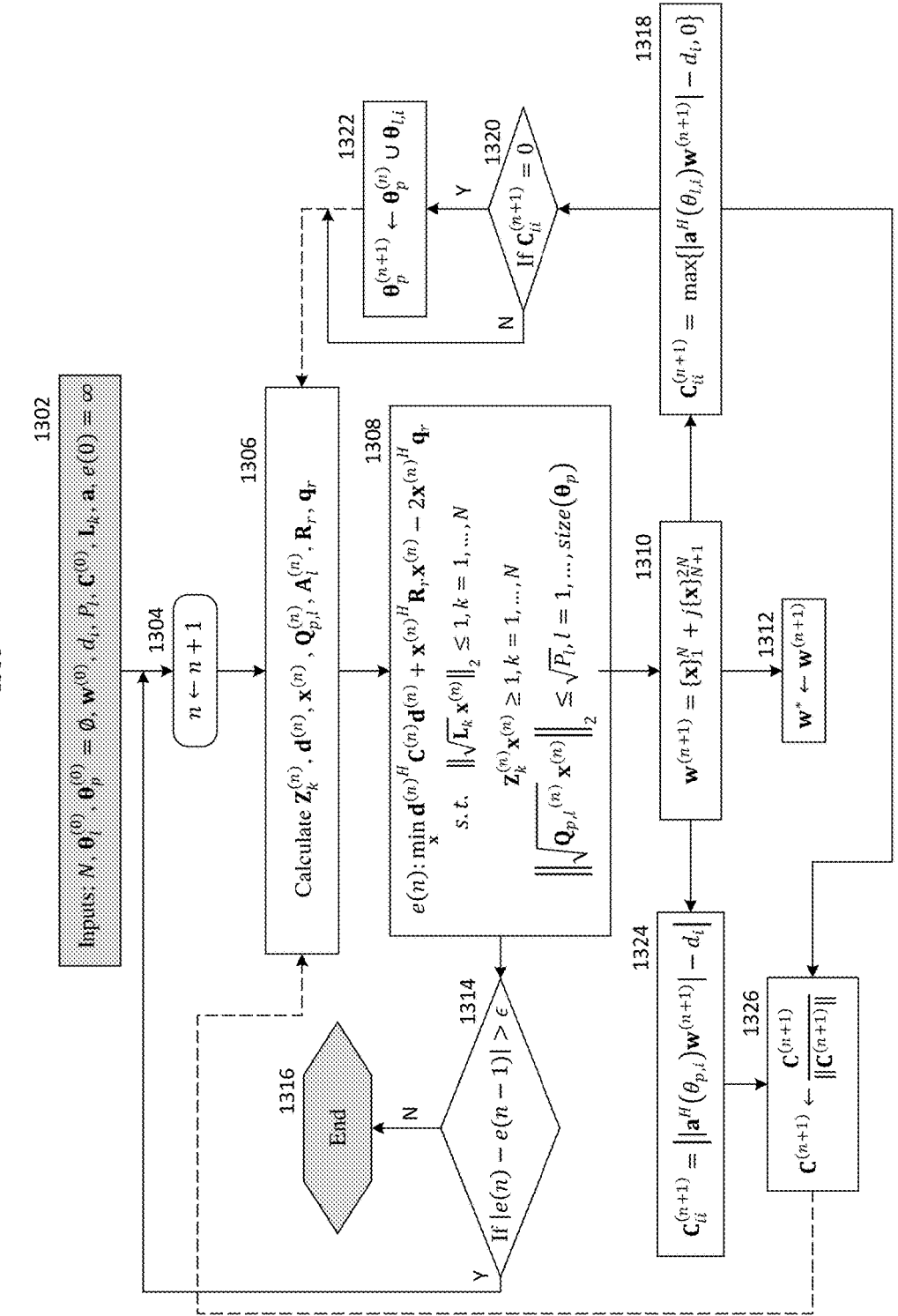
FIGS. 13A and 13B show an exemplary method of array pattern synthesis for phase control with amplitude tapering beamforming according to some aspects.
Figure 13B:
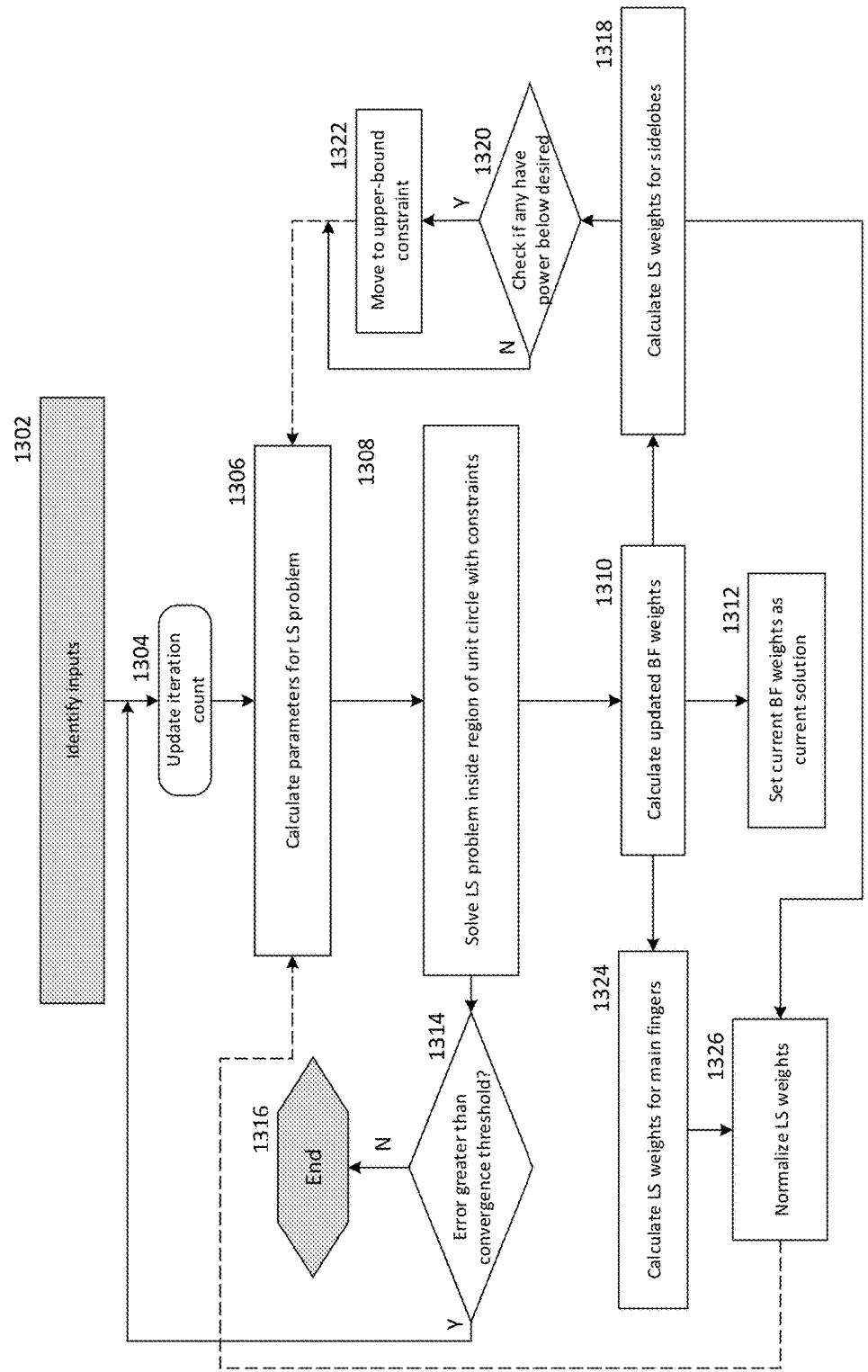

FIGS. 13A and 13B show an exemplary process 1300, which describes array pattern synthesis using phase control with amplitude tapering according to some aspects. FIG. 13A expresses process 1300 algorithmically while FIG. 13B expresses process 1300 in prose, where the underlying logic at each stage in both expressions is equivalent. Beamforming controller 214 may similarly iteratively calculate complex beamforming weights w using least-squares optimization for a first group $\theta_l$ of azimuth angles while using an upper-bound constraint for a second group $\theta_p$ of azimuth angles. However, instead of constraining complex beamforming weights $w_n$ of w to $|w_n|=1$, beamforming controller 214 may constrain $w_n$ to $\alpha \leq |w_n| \leq 1$ according to phase control with amplitude tapering.

Figure 14A:
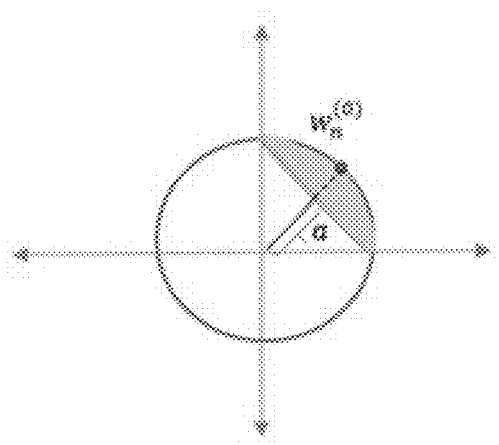
FIGS. 14A and 14B show an illustrative example of iteratively solving for phase control with amplitude tapering complex beamforming weights for array pattern synthesis according to some aspects.
Figure 14B:
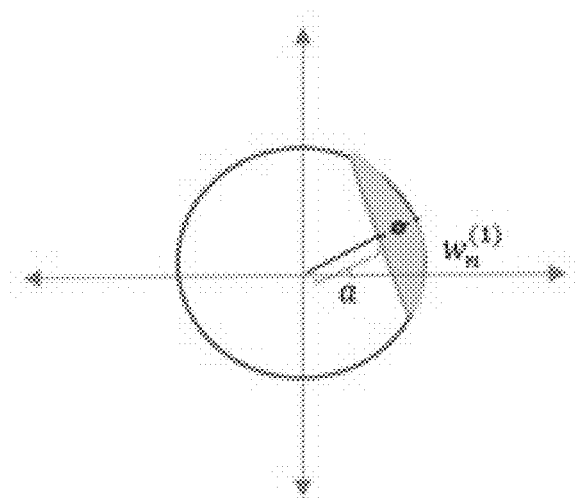

Accordingly, beamforming controller 214 may solve the least-squares problem in a similar manner to that of the phase-only approach, with the primary difference being in the definition of the search space constraints for each $w_n$ of w. FIGS. 14A and 14B illustrate the search space constraining $w_n$ to $\alpha \leq |w_n| \leq 1$ that beamforming controller 214 may apply to transform the least-squares problem into a convex problem. Accordingly, instead of searching the entire two-dimensional ring defined by $\alpha \leq |w_n| \leq 1$ for updates to $w_n$, beamforming controller 214 may instead define a region of the unit circle as shown in FIG. 14A as the search space for solving the least-squares problem. In particular, given $w_n^{(k)}$ from iteration k, the region is defined as being between a line perpendicular to the line $e^{jw_n^{(k)}}$, where the minimum distance between the origin and this line is $\alpha$, and the unit circle. For each iteration k, beamforming controller 214 may rotate this region according to the solution of the previous iteration $w_n^{(k-1)}$ and define a new region satisfying these conditions with which to solve for $w_n^{(k)}$ Beamforming controller 214 may iteratively solve the least-squares for $w^{(k)}$ in this region based on the azimuth angles of $\theta_l$ while similarly constraining the azimuth angles of $\theta_p$ to remain below their respective upper bounds $P_l$.

Process 1300 describes the algorithmic logic which beamforming controller 214 may execute (as program code or as digitally-configured hardware circuitry) to solve for w using phase control with amplitude tapering. As can be seen from FIGS. 13A and 13B, beamforming controller 214 may solve for w using similar algorithmic logic, with the exception being in the definition of the constraint conditions for the least-squares solution in stage 1308 and the initialization and calculation of the terms related to these constraints in stages 1302 and 1306, respectively. In particular, beamforming controller 214 may initialize $L_k$ in stage 1302 as $$L^{(n)}(i,j) = \begin{cases} 1, & i = j = k \\ 0 & \text{otherwise} \end{cases}, k = 1, \ldots, N \quad (29)$$

which defines the unit circle as shown in FIGS. 14A and 14B.

Beamforming controller 214 may then increment the iteration count at stage 1304, and proceed to stage 1306 to calculate $Z_k^{(n)}$, $d^{(n)}$, $x^{(n)}$, $Q_{p,l}^{(n)}$, $A_l^{(n)}$, $R_r$, and $q_r$, which are the parameters used by beamforming controller 214 to define and solve the least-squares problem. In particular, beamforming controller 214 may calculate $d^{(n)}$, $x^{(n)}$, $Q_{p,l}^{(n)}$, $A_l^{(n)}$, $R_r$, and $q_r$ in the manner expressed above in Equations (18)-(23), respectively, which may rely on $C^{(n)}$ from the previous iteration (either) $C^{(0)}=1$ as initialized or $C^{(n>0)}$ as calculated in stages 1318, 1324, and 1326). Beamforming controller 214 may calculate $Z_k^{(n)}$ as $$Z_k^{(n)}(i,j) = \begin{cases} \dfrac{\cos(\arg w_n^{(n)})}{a}, & i = j = k \\ \dfrac{\sin(\arg w_n^{(n)})}{a}, & i = k, j = k + N \\ 0, & \text{otherwise} \end{cases}, k = 1, \ldots, N \quad (30)$$

which defines the line shown in FIGS. 14A and 14B (perpendicular to the line formed between the origin and $w_n$) that intersects the unit circle and thus defines the other boundary of the region used for the search space.

After obtaining the parameters in stage 1306, beamforming controller 214 may solve the least-squares problem in stage 1308 for the azimuth angles of $\theta_l$ according to the relevant constraints for the upper bound constraint azimuth angles of $\theta_p$ and the complex beamforming weight constraints on $w_n$ according to phase control with amplitude tapering. As shown in FIGS. 13A and 13B, beamforming controller 214 may evaluate the same expression $d^{(n)H}C^{(n)}d^{(n)} + x^{(n)H}R_r x^{(n)} - 2x^{(n)H}q_r$ as in the phase-only case to obtain x (e.g., the vector x that minimizes this expression) and e(n) (e.g., the value of this expression given the identified solution x) while using the same upper-bound constraint $\|\sqrt{Q_{p,l}^{(n)}} x^{(n)}\|_2 \leq \sqrt{P_l}$, l=1, …, size($\theta_p$) for the azimuth angles of $\theta_p$. However, as the search space is different than the phase-only case, beamforming controller 214 may also constrain the solution x $$\|\sqrt{L_k} x^{(n)}\|_2 \leq 1, k=1, \ldots, N$$

such that $$Z_k^{(n)} x^{(n)} \geq 1, k=1, \ldots, N \quad (31)$$

which limits the search space for x to restrict the complex beamforming weights $w_n$ of $w^{(n)}$ to be within the region defined in FIGS. 14A and 14B.

Beamforming controller 214 may then calculate $w^{(n+1)}$ from x in stage 1310 as $w^{(n+1)} = \{x\}_1^N + j\{x\}_{N+1}^{2N}$ which, unlike in Equation (9), does not have a constant modulus as $w^{(n+1)}$ can have any amplitude between $\alpha$ and 1 for phase control with amplitude tapering). Beamforming controller 214 may then perform the remaining process of process 1300 in the same manner as in process 1100, including storing $w^{(n+1)}$ as the current solution $w^{(*)}$ in stage 1312, updating the least-square weights $C^{(n)}$ for the sidelobe azimuth angles of $\theta_l$ and switching certain sidelobe azimuth angles from $\theta_l$ to $\theta_p$ in stages 1318-1322, updating the least-square weights $C^{(n)}$ for the main finger azimuth angles of $\theta_l$ and normalizing the least-square weights $C^{(n)}$ in stages 1324 and 1326, and checking for convergence with e(n) in stages 1314 and 1316. Beamforming controller 214 may therefore iteratively find a solution w* that produces a radiation pattern approaching the desired radiation pattern using phase control with amplitude tapering with process 1300.

Equivalent to the algorithmic logic described above for process 1300, beamforming controller 214 may execute process 1300 (as program code or as digitally configured hardware) according to the following pseudocode:

---

Algorithm for Phase control and Amplitude Tapering Array Pattern Synthesis:

Input: Total number of antennas N, azimuth angles $\theta_{l,k} \in \theta_l^{(0)}$, $\theta_{p,l} \in \theta_p^{(0)} =$ $w^{(0)} \in \mathbb{C}^{N \times 1}$ initial phase values (arbitrary), desired radiation pattern $d_l$, minimum amplitude level a, power upper bound $P_l$, least-square weights $C^{(0)} = I_{|\theta_l|}$. e(0) = $\infty$.

Do {

$$L_k(i,j) = \begin{cases} 1, & i = j = k \\ 0, & \text{otherwise} \end{cases}, k = 1, \ldots, N$$

$$Z_k^{(n)}(i,j) = \begin{cases} \dfrac{\cos(\arg w_n^{(n)})}{a}, & i = j = k \\ \dfrac{\sin(\arg w_n^{(n)})}{a}, & i = k, j = k + N \\ 0, & \text{otherwise} \end{cases}, k = 1, \ldots, N$$

Find: $d^{(n)} = \left[ d_1 e^{j \arg(a^H(\theta_{l,1}) w^{(n)})}, \ldots, d_{|\theta_l|} e^{j \arg(a^H(\theta_{l,|\theta_l|}) w^{(n)})} \right]^T$, $A_l^{(n)} \leftarrow [a(\theta_{l,1}), \ldots, a(\theta_{l,|\theta_l|})]$, Algorithm for Phase control and Amplitude Tapering Array Pattern Synthesis:

$$Q_{p,l}^{(n)} = \begin{bmatrix} \text{Re}\{a(\theta_{p,l})a^H(\theta_{p,l})\} & -\text{Im}\{a(\theta_{p,l})a^H(\theta_{p,l})\} \\ \text{Im}\{a(\theta_{p,l})a^H(\theta_{p,l})\} & \text{Re}\{a(\theta_{p,l})a^H(\theta_{p,l})\} \end{bmatrix}, l = 1, \ldots, |\theta_p|$$

$$R_r = \begin{bmatrix} \text{Re}\{A_l^{(n)}C^{(n)}(A_l^{(n)})^H\} & -\text{Im}\{A_l^{(n)}C^{(n)}(A_l^{(n)})^H\} \\ \text{Im}\{A_l^{(n)}C^{(n)}(A_l^{(n)})^H\} & \text{Re}\{A_l^{(n)}C^{(n)}(A_l^{(n)})^H\} \end{bmatrix}$$

$$q_r = [\text{Re}\{A_l^{(n)}C^{(n)}d^{(n)}\} \; \text{Im}\{A_l^{(n)}C^{(n)}d^{(n)}\}]^T$$
$$x^{(n)} = [\text{Re}\{w^{(n)}\} \; \text{Im}\{w^{(n)}\}]^T$$

Solve:

$$e(n): \min_x \; d^{(n)H}C^{(n)}d^{(n)} + x^{(n)H}R_r x^{(n)} - 2x^{(n)H}q_r$$

s.t. $\left\| \sqrt{L_k} \, x^{(n)} \right\|_2 \leq 1, \; k = 1, \ldots, N$ $Z_k^{(n)} x^{(n)} \geq 1, \; k = 1, \ldots, N$ $\left\| \sqrt{Q_{p,l}^{(n)}} \, x^{(n)} \right\|_2 \leq \sqrt{P_l}, \; l = 1, \ldots, |\theta_p|$ Find:
$$w^{(n+1)} = \{x\}_1^N + j\{x\}_{N+1}^{2N}$$

$$C_{ll}^{(n+1)} = \begin{cases} \max\{|a^H(\theta_{p,l})w^{(n+1)}| - d_l, 0\}, & \text{if sidelobe} \\ ||a^H(\theta_{p,l})w^{(n+1)}| - d_l|, & \text{if main beam} \end{cases}, l = 1, \ldots, |\theta_l|$$

if $C_{ll}^{(n+1)} == 0$, do $\theta_l^{(n+1)} \leftarrow \theta_l^{(n)} \backslash \theta_{l,l}$ and $\theta_p^{(n+1)} \leftarrow \theta_p^{(n)} \cup \theta_{l,l} \; \forall l$
 Normalize $C^{(n+1)}$
n ← n + 1}
while ($|e(n) - e(n-1)| \geq \epsilon$)

Figure 15A:
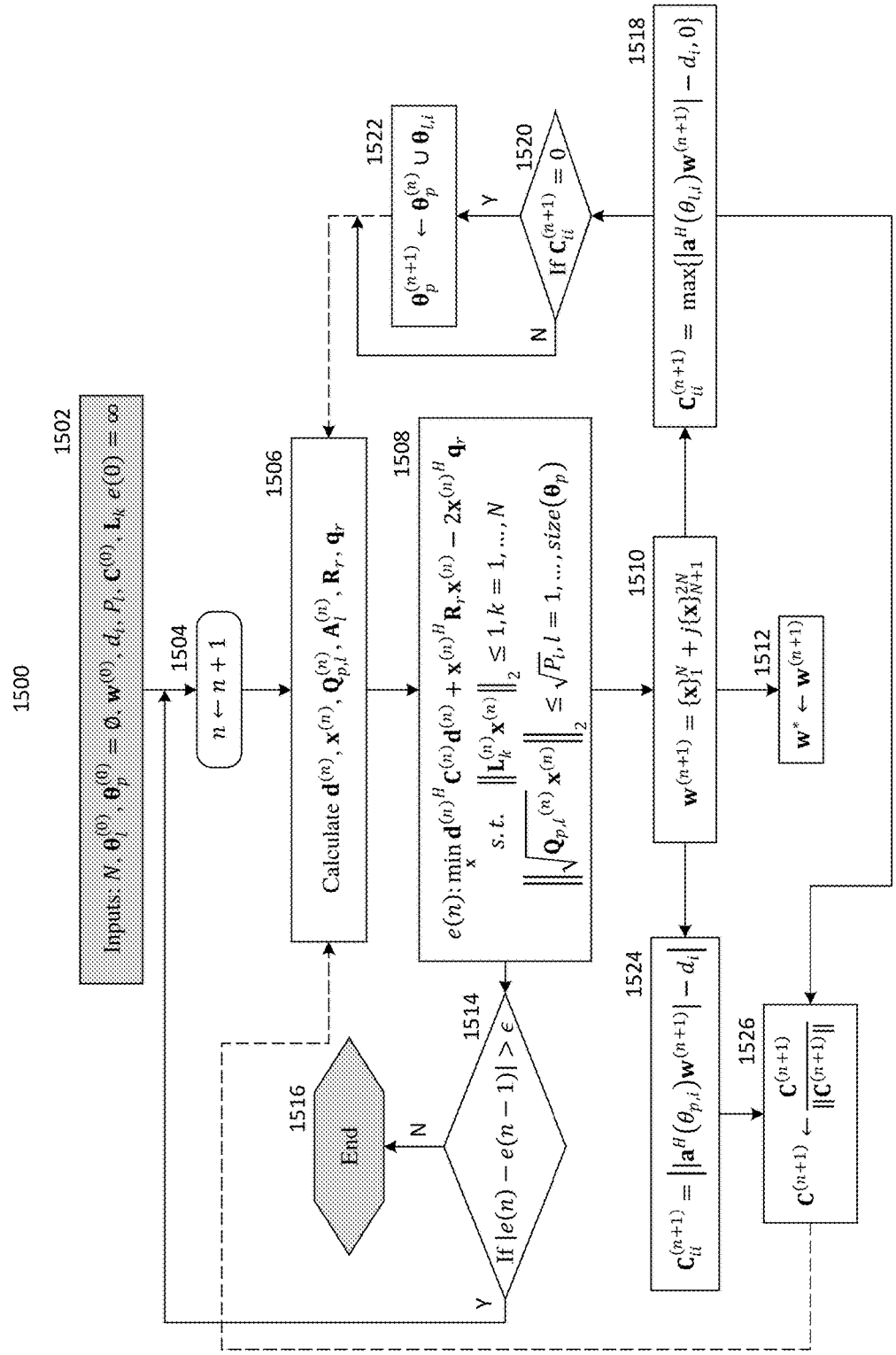
FIGS. 15A and 15B show an exemplary method of array pattern synthesis for phase and amplitude control beamforming according to some aspects.
Figure 15B:
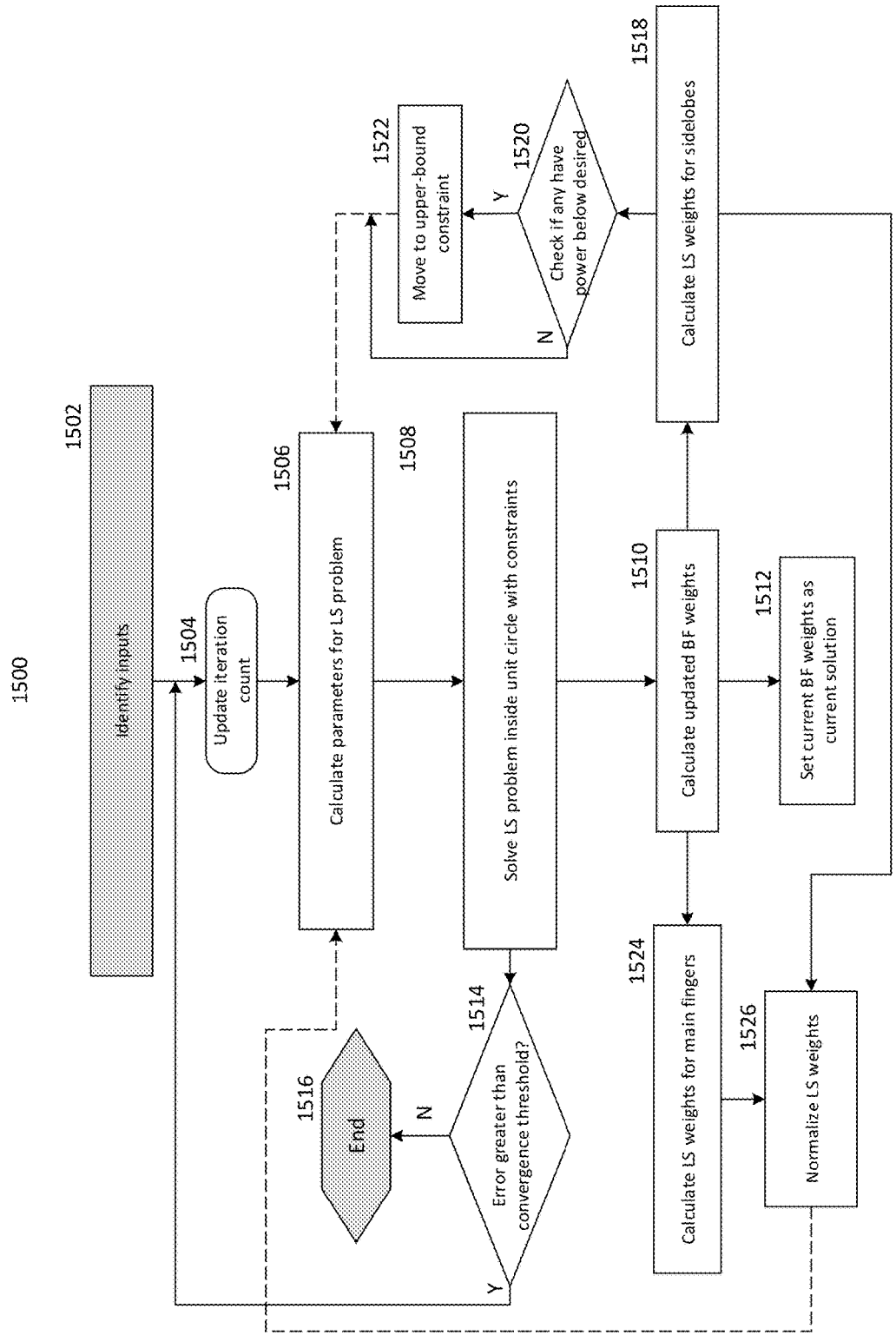

FIGS. 15A and 15B show an exemplary process 1500, which beamforming controller 214 may execute to perform array pattern synthesis with phase and amplitude control beamforming. FIG. 15A expresses process 1500 algorithmically while FIG. 15B expresses process 1500 in prose, where the underlying logic at each stage in both expressions is equivalent. Similar to the differences between processes 1100 and 1300, beamforming controller 214 may utilize a different constraint on the complex beamforming weights $w_n$ in accordance with phase and amplitude control beamforming. In particular, as opposed to limiting complex beamforming weights $w_n$ to points along the unit circle as $|w_n|=1$ or to a certain ring-shaped region within the unit circle as $\alpha \leq |w_n| \leq 1$, beamforming controller 214 may constrain complex beamforming weights $w_n$ to anywhere within the unit circle as $0 \leq |w_n| \leq 1$.

Accordingly, as the constraint related to $Z_k^{(n)}$ is unnecessary (as it relates to the amplitude tapering lower bound $\alpha$) for the phase and amplitude control case, beamforming controller 214 may perform generally the same process in process 1500 as in process 1300 with the omission of the calculation of $Z_k^{(n)}$ in stage 1506 and the omission of the application of the related constraint $Z_k^{(n)}x^{(n)} \geq 1, k=1, \ldots, N$ in stage 1508. Beamforming controller 214 may therefore perform stages 1502-1526 of process 1500 in the same manner as stages 1302-1326 of process 1300 with the exception of these omissions.

Beamforming controller 214 may therefore execute process 1500 with program code or with digitally-configured hardware circuitry to solve for complex beamforming weights w* using least-squares optimization where each $w_n$ of w* satisfies $0 \leq |w_n| \leq 1$. Equivalent to the algorithmic logic described above for process 1500, beamforming controller 214 may execute process 1500 (as program code or as digitally configured hardware) according to the following pseudocode:

Algorithm for Phase and Amplitude Control Array Pattern Synthesis:

Input: Total number of antennas N, azimuth angles $\theta_{l,k} \in \theta_l^{(0)}$, $\theta_{p,l} \in \theta_p^{(0)} = \phi$, and $w^{(0)} \in \mathbb{C}^{N \times 1}$ initial phase values (arbitrary), desired radiation pattern $d_l$, power upper bound $P_l$, least-square weights $C^{(0)} = I_{|\theta_l|} \cdot e(0) = \infty$.

Do{

• $L_k(i, j) = \begin{cases} 1, & i = j = k \\ 0, & \text{otherwise} \end{cases}, \; k = 1, \ldots, N$

• Find: $d^{(n)} = \left[ d_1 e^{j \arg(a^H(\theta_{l,1})w^{(n)})}, \ldots, d_{|\theta_l|} e^{j \arg(a^H(\theta_{l,|\theta_l|})w^{(n)})} \right]^T$, $A_l^{(n)} \leftarrow [a(\theta_{l,1}), \ldots, a(\theta_{l,|\theta_l|})],$ -continued Algorithm for Phase and Amplitude Control Array Pattern Synthesis:

Input: Total number of antennas N, azimuth angles $\theta_{l,k} \in \theta_l^{(0)}$, $\theta_{p,l} \in \theta_p^{(0)} = \phi$, and $w^{(0)} \in \mathbb{C}^{N \times 1}$ initial phase values (arbitrary), desired radiation pattern $d_l$, power upper bound $P_l$, least-square weights $C^{(0)} = I_{|\theta_l|} \cdot e(0) = \infty$.

$$Q_{p,l}^{(n)} = \begin{bmatrix} \text{Re}\{a(\theta_{p,l})a^H(\theta_{p,l})\} & -\text{Im}\{a(\theta_{p,l})a^H(\theta_{p,l})\} \\ \text{Im}\{a(\theta_{p,l})a^H(\theta_{p,l})\} & \text{Re}\{a(\theta_{p,l})a^H(\theta_{p,l})\} \end{bmatrix}, l = 1, \ldots, |\theta_p|$$

$$R_r = \begin{bmatrix} \text{Re}\{A_l^{(n)}C^{(n)}(A_l^{(n)})^H\} & -\text{Im}\{A_l^{(n)}C^{(n)}(A_l^{(n)})^H\} \\ \text{Im}\{A_l^{(n)}C^{(n)}(A_l^{(n)})^H\} & \text{Re}\{A_l^{(n)}C^{(n)}(A_l^{(n)})^H\} \end{bmatrix}$$

$$q_r = [\text{Re}\{A_l^{(n)}C^{(n)}d^{(n)}\} \quad \text{Im}\{A_l^{(n)}C^{(n)}d^{(n)}\}]^T$$

$$x^{(n)} = [\text{Re}\{w^{(n)}\} \quad \text{Im}\{w^{(n)}\}]^T$$

- Solve:

$$e(n): \min_x \ d^{(n)H}C^{(n)}d^{(n)} + x^{(n)H}R_r x^{(n)} - 2x^{(n)H}q_r$$

$$\text{s.t.} \ \|\sqrt{L_k}\, x^{(n)}\|_2 \leq 1, k = 1, \ldots, N$$

$$\|\sqrt{Q_{p,l}^{(n)}}\, x^{(n)}\|_2 \leq \sqrt{P_l}, l = 1, \ldots, |\theta_p|$$

- Find:

$$w^{(n+1)} = \{x\}_1^N + j\{x\}_{N+1}^{2N}$$

$$C_u^{(n+1)} = \begin{cases} \max\{|a^H(\theta_{p,l})w^{(n+1)}| - d_l, 0\}, & \text{if sidelobe} \\ \||a^H(\theta_{p,l})w^{(n+1)}| - d_l|, & \text{if main beam} \end{cases}, l = 1, \ldots, |\theta_l|$$

if $C_u^{(n+1)} == 0$, do $\theta_l^{(n+1)} \leftarrow \theta_l^{(n)} \backslash \theta_{l,l}$ and $\theta_p^{(n+1)} \leftarrow \theta_p^{(n)} \cup \theta_{l,l} \ \forall l$ Normalize $c^{(n+1)}$
n ← n + 1} while $(|e(n) - e(n-1)| \geq \epsilon)$

---

Aspects of array pattern synthesis described herein may be advantageous in codebook design for massive MIMO and mmWave systems, in particular with respect to lower sidelobes (e.g., for interference rejection), broad beams (e.g., for fast sector sweeps, diversity and multiplexing gain), null steering (e.g., for directional blocker/interference mitigation), and multi-finger beam design (e.g., for single-stream applications such as control channel transmission). Aspects of array pattern synthesis may be particular applicable for beam broadening patterns, which may yield higher main beam power and less ripple at the main beam compared to existing solutions.

Similar to as described above for multi-finger beamforming, various aspects of the array pattern synthesis approach (according to any of process 1100, 1300, or 1500 may be performed offline or online. Accordingly, in various aspects beamforming controller 214 (or another offline processor or processing component) may be configured to perform array pattern synthesis beamforming when operating in an offline manner, e.g., when 200communication device 200 is not actively transmitting or receiving with any users. For instance, beamforming controller 214 may generate a predefined set of complex beamforming weight vectors (e.g., forming a codebook $\mathcal{W} \in \{w_1, w_2 \ldots w_P\}$, where P is the codebook size and each $w_p$, p=1, . . . , P, is a different codeword of length N), each based on a different desired radiation pattern, while operating offline. Once operating online (e.g., during runtime and/or when 200communication device 200 is actively transmitting or receiving with users), beamforming controller 214 may select a complex beamforming weight vector w from $\mathcal{W}$ having an appropriate radiation pattern (e.g., based on user positioning/angular direction relative to antenna array 202) and apply the complex beamforming weight vector to transmit and/or receive at antenna array 202. Accordingly, while beamforming controller 200200 (or another offline processor or processing component) may generate the complex beamforming weight vectors using array pattern synthesis beamforming while offline, beamforming controller 200200 may utilize the resulting complex beamforming weight vectors when operating online.

In some aspects, beamforming controller 214 may be configured to perform array pattern synthesis beamforming online, e.g., when 200communication device 200 is actively transmitting or receiving with one or more users. For example, beamforming controller 214 may identify the angular direction of L users from antenna array 202 (e.g., based on Angle-of-Arrival or similar processing techniques) and may generate a desired radiation pattern defined by d, $\theta_l$, and $P_l$, where certain azimuth angles of $\theta_l$ may be main finger azimuth angles with desired power levels defined by d and other azimuth angles of $\theta_l$ may be sidelobe azimuth angles defined by P. In some aspects, beamforming controller 214 may also identify the distance of the L users from antenna array 202 (e.g., based on received signal strength or transmission timing processing) and generate the power levels of d based on how far each user is from antenna array 202. In some aspects, beamforming controller 214 may also identify certain angular directions that are targeted for null steering or interference suppression, such as based on the locations of other users that 200communication device 200 is not actively transmitting or receiving with. Beamforming controller 214 may then execute multi-finger beamforming according to any of processes 1100, 1300, or 1500 to obtain complex beamforming weights w* that approach the optimal complex beamforming weights for the desired radiation pattern defined by d, $\theta_l$, and $P_l$.

In some aspects, beamforming controller 214 may repeatedly trigger array pattern synthesis beamforming to obtain repeated updated complex beamforming weights w* when operating online, such as in part of an adaptive beamforming approach. For example, beamforming controller 214 may periodically determine the angular directions and distances of L users (where L may also increase and decrease based on how many users are within the coverage area of 200communication device 200), such as by determining angular directions and distances of the users during each scheduling interval. Beamforming controller 214 may then calculate complex beamforming weights w* to use during each scheduling interval based on the current angular direction and distances of the users, where beamforming controller 214 may re-calculate w* each scheduling interval to dynamically adapt to any changes in the angular direction, distance, or number of users.

Figure 16:
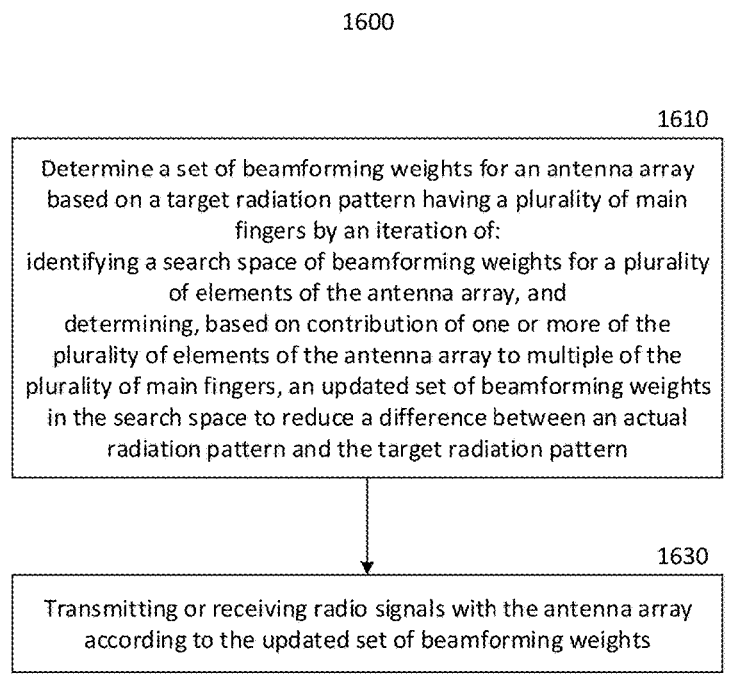
FIG. 16 shows an exemplary method of performing beamforming according to some aspects.

FIG. 16 shows an exemplary process 1600 of performing beamforming according to some aspects. As shown in FIG. 16, process 1600 includes determining a set of beamforming weights for an antenna array based on a target radiation pattern having a plurality of main fingers by an iteration of identifying a search space of beamforming weights for a plurality of elements of the antenna array, and determining, based on contribution of one or more of the plurality of elements of the antenna array to multiple of the plurality of main fingers, an updated set of beamforming weights in the search space to reduce a difference between an actual radiation pattern and the target radiation pattern (1610), the method further including transmitting or receiving radio signals with the antenna array based on the updated set of beamforming weights (1620).

Figure 17:
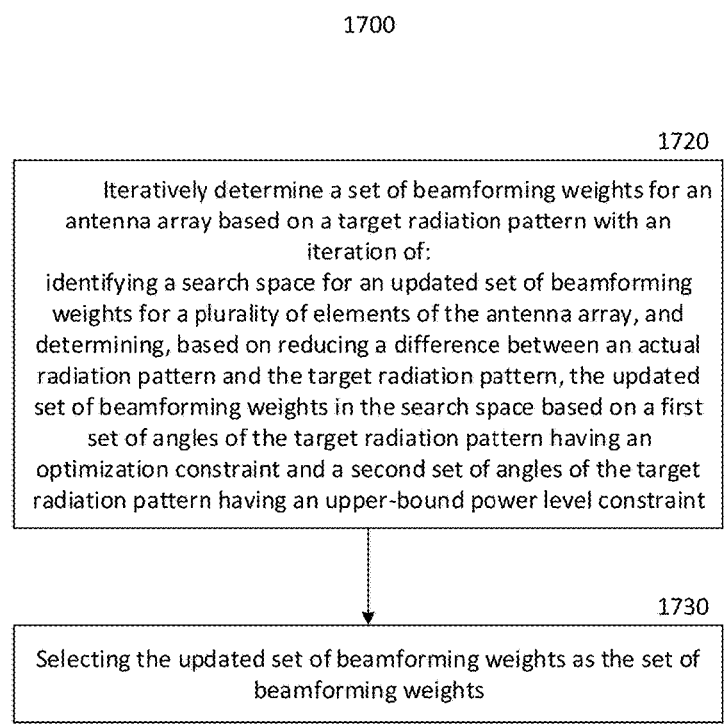
FIG. 17 shows an exemplary method of synthesizing antenna array radiation patterns according to some aspects.

FIG. 17 shows an exemplary process 1700 of performing beamforming according to some aspects. As shown in FIG. 17, process 1700 includes iteratively determining a set of beamforming weights for an antenna array based on a target radiation pattern with an iteration of identifying a search space for an updated set of beamforming weights for a plurality of elements of the antenna array, and determining, based on reducing a difference between an actual radiation pattern and the target radiation pattern, the updated set of beamforming weights in the search space based on a first set of angles of the target radiation pattern having an optimization constraint and a second set of angles of the target radiation pattern having an upper-bound power level constraint (1710), the method further including selecting the updated set of beamforming weights as the set of beamforming weights (1720).

In one or more further exemplary aspects of the disclosure, one or more of the features described above in reference to FIGS. 1-15 may be further incorporated into process 1600 and/or 1700. In particular, process 1600 and/or 1700 may be configured to perform further and/or alternate processes as detailed regarding beamforming controller 214 and/or 200communication device 200.

The terms "user equipment", "UE", "mobile terminal", "user terminal", "terminal device", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of performing beamforming, the method including determining a set of beamforming weights for an antenna array based on a target radiation pattern having a plurality of main fingers by an iteration of identifying a search space of beamforming weights for a plurality of elements of the antenna array, and determining, based on contribution of one or more of the plurality of elements of the antenna array to multiple of the plurality of main fingers, an updated set of beamforming weights in the search space to reduce a difference between an actual radiation pattern and the target radiation pattern, the method further including transmitting or receiving radio signals with the antenna array based on the updated set of beamforming weights.

In Example 2, the subject matter of Example 1 can optionally include wherein the actual radiation pattern characterizes a radiation pattern from applying the updated set of beamforming weights at an antenna array.

In Example 3, the subject matter of Example 1 or 2 can optionally include wherein determining the updated set of beamforming weights in the search space includes determining the updated set of beamforming weights based on a least-squares problem that generates a result with minimized difference between the target radiation pattern and the actual radiation pattern.

In Example 4, the subject matter of Example 3 can optionally include wherein the least-squares problem includes contribution from each of the plurality of elements of the antenna array to each of the plurality of main fingers of the target radiation pattern.

In Example 5, the subject matter of any one of Examples 1 to 4 can optionally include wherein the search space for the updated set of beamforming weights constrains the updated set of beamforming weights to have unity gain.

In Example 6, the subject matter of any one of Examples 1 to 4 can optionally include wherein the set of beamforming weights are phase-only beamforming weights located on the unit circle.

In Example 7, the subject matter of any one of Examples 1 to 6 can optionally include wherein, for a first element of the plurality of elements, the search space for the updated beamforming weight is a tangent line of the unit circle at a current beamforming weight of the first element, and wherein determining the updated set of beamforming weights in the search space includes determining a solution to a least-squares problem along the tangent line for the first element of the antenna array, locating the closest point on the unit circle to the solution on the tangent line for the first element of the antenna array, and using the closest point on the unit circle as the updated beamforming weight for the first element of the antenna array in the updated set of beamforming weights.

In Example 8, the subject matter of any one of Examples 1 to 7 can optionally include wherein determining the set of beamforming weights for the antenna array includes iteratively identifying the search space and determining the updated set of beamforming weights until the updated set of beamforming weights satisfies a convergence condition.

In Example 9, the subject matter of Example 8 can optionally include wherein the iteration further includes determining the actual radiation pattern based on the updated set of beamforming weights obtained in the iteration, determining an error term based on the difference between the actual radiation pattern and the desired radiation pattern, determining that the convergence condition is satisfied if the error term is less than a predefined convergence parameter.

In Example 10, the subject matter of Example 8 or 9 can optionally include the method further including after the updated set of beamforming weights satisfies the convergence condition, updating a maximum main finger power level or updating a maximum sidelobe power level based on the actual radiation pattern produced by the updated set of complex beamforming weights, and iteratively re-determining the set of beamforming weights for the antenna array by identifying the search space and determining the updated set of beamforming parameters based on the maximum main finger power level and the maximum sidelobe power level.

In Example 11, the subject matter of Example 10 can optionally include wherein updating the maximum main finger power level or updating the maximum sidelobe power level includes incrementing the maximum sidelobe power level or decrementing the maximum main finger power level.

In Example 12, the subject matter of any one of Examples 1 to 11 can optionally include wherein the target radiation pattern is defined over one or more main finger angles and one or more sidelobe angles, and wherein determining the updated set of beamforming weights includes determining an updated set of beamforming weights for which the actual radiation pattern has predetermined ratios between the power levels of the one or more main finger angles.

In Example 13, the subject matter of any one of Examples 1 to 12 can optionally further include identifying a new target radiation pattern based on adaptive beamforming, and iteratively determining a new set of beamforming weights for the antenna array based on the new target radiation pattern.

In Example 14, the subject matter of Example 13 can optionally further include transmitting or receiving radio signals with the antenna array based on the new set of beamforming weights.

Example 15 is a non-transitory computer readable medium storing instructions that, when executed by a processor, cause the processor to perform the method of any one of Examples 1 to 14.

Example 16 is a non-transitory computer readable medium storing instructions that, when executed by a controller of a communication device, cause the communication device to perform the method of any one of Examples 1 to 14.

Example 17 is a communication device including an antenna array, a beamforming controller, and a transmit or receive path, that is configured to perform the method of any one of Examples 1 to 16.

Example 18 is a method of synthesizing antenna array radiation patterns, the method including iteratively determining a set of beamforming weights for an antenna array based on a target radiation pattern with an iteration of identifying a search space for an updated set of beamforming weights for a plurality of elements of the antenna array, and determining, based on reducing a difference between an actual radiation pattern and the target radiation pattern, the updated set of beamforming weights in the search space based on a first set of angles of the target radiation pattern having an optimization constraint and a second set of angles of the target radiation pattern having an upper-bound power level constraint, the method further including selecting the updated set of beamforming weights as the set of beamforming weights.

In Example 19, the subject matter of Example 18 can optionally include wherein the actual radiation pattern characterizes the radiation pattern produced by applying the updated set of beamforming weights at an antenna array.

In Example 20, the subject matter of Example 18 or 19 can optionally include wherein the target radiation pattern is defined over one or more main finger angles and one or more sidelobe angles.

In Example 21, the subject matter of Example 20 can optionally include wherein the iteration further includes determining if the actual radiation pattern at any of the one or more sidelobe angles in the first set of angles is below a target power level, and moving the identified sidelobe angles to the second set of angles if the actual radiation pattern is below the target power level.

In Example 22, the subject matter of Example 21 can optionally include wherein the first set of angles initially includes all of the one or more main finger angles and all of the one or more sidelobe angles.

In Example 23, the subject matter of any one of Examples 18 to 22 can optionally include wherein determining the updated set of beamforming weights includes determining a solution for a least-squares problem for the first set of angles based on the optimization constraint while constraining the updated set of beamforming weights to keep the actual radiation pattern below target power levels at the second set of angles.

In Example 24, the subject matter of Example 23 can optionally include wherein the optimization constraint minimizes the difference between target power levels at the first set of angles of the target radiation pattern and the power levels at the first set of angles of the actual radiation pattern.

In Example 25, the subject matter of any one of Examples 18 to 24 can optionally include wherein iteratively determining the set of beamforming weights for the antenna array includes iteratively identifying the search space and determining the updated set of beamforming weights until the updated set of beamforming weights satisfies a convergence condition.

In Example 26, the subject matter of Example 25 can optionally include wherein each iteration further includes determining the actual radiation pattern based on the updated set of beamforming weights obtained in the iteration, determining an error term based on the difference between the actual radiation pattern and the desired radiation pattern, and determining that the convergence condition is satisfied if the error term is less than a predefined convergence parameter.

In Example 27, the subject matter of any one of Examples 18 to 26 can optionally include wherein the set of beamforming weights are for phase-only beamforming and wherein the search space constrains the updated set of beamforming weights to locations on the unit circle.

In Example 28, the subject matter of any one of Examples 18 to 27 can optionally include wherein, for a first element of the plurality of elements, the search space for the updated beamforming weight is a tangent line of the unit circle at a current beamforming weight of the first element, and wherein determining the updated set of beamforming weights in the search space includes determining a solution to a least-squares problem for the first set of angles along the tangent line for the first element of the antenna array, locating the closest point on the unit circle to the solution on the tangent line for the first element, and using the closest point on the unit circle as the updated beamforming weight for the first element in the updated set of beamforming weights.

In Example 29, the subject matter of any one of Examples 18 to 26 can optionally include wherein the set of beamforming weights are for phase control with amplitude tapering beamforming, and wherein the search space constrains the updated set of beamforming weights locations within a two-dimensional ring including radial distances between a minimum tapering amplitude and the unit circle.

In Example 30, the subject matter of any one of Examples 18 to 26 or 29 can optionally include wherein, for a first element of the plurality of elements, the search space for the updated beamforming weight is a region between the unit circle and a line intersecting the unit circle that is perpendicular to the line between the origin of the unit circle and a current beamforming weight, and wherein determining the updated set of beamforming weights in the search space includes determining the updated set of beamforming weights in the region.

In Example 31, the subject matter of any one of Examples 18 to 26 can optionally include wherein the set of beamforming weights are phase and amplitude control beamforming and wherein the search space constrains the updated set of beamforming weights locations within the unit circle.

In Example 32, the subject matter of any one of Examples 18 to 26 or 31 can optionally include wherein, for a first element of the plurality of elements, the search space for the updated beamforming weight is the unit circle, and wherein determining the updated set of beamforming weights in the search space includes determining the updated set of beamforming weights in the unit circle.

In Example 33, the subject matter of any one of Examples 18 to 32 can optionally further include performing the method offline to generate a beamforming codebook including sets of beamforming weights for different target radiation patterns.

In Example 34, the subject matter of any one of Examples 18 to 32 can optionally further include transmitting or receiving radio signals with the antenna array based on the set of beamforming weights.

Example 35 is a non-transitory computer readable medium storing instructions that, when executed by a processor, cause the processor to perform the method of any one of Examples 18 to 35.

Example 36 is a non-transitory computer readable medium storing instructions that, when executed by a controller of a communication device, cause the communication device to perform the method of any one of Examples 18 to 35.

Example 37 is a communication device including an antenna array, a beamforming controller, and a transmit or receive path, that is configured to perform the method of any one of Examples 18 to 35.

Example 38 is a communication device including an antenna array, and a beamforming controller configured to determine a set of beamforming weights for the antenna array based on a target radiation pattern having a plurality of main fingers, wherein the beamforming controller is configured to, in each of a plurality of iterations identify a search space of beamforming weights for a plurality of elements of the antenna array, and determine, based on contribution of one or more of the plurality of elements of to multiple of the plurality of main fingers, an updated set of beamforming weights in the search space to reduce a difference between an actual radiation pattern and the target radiation pattern, the antenna array configured to transmit or receive radio signals based on the updated set of beamforming weights.

In Example 39, the subject matter of Example 38 can optionally include wherein the beamforming controller is implemented as one or more processors configured to execute program code or as digitally-configured hardware circuitry.

In Example 40, the subject matter of Example 38 or 39 can optionally include wherein the actual radiation pattern characterizes a radiation pattern from applying the updated set of beamforming weights at an antenna array.

In Example 41, the subject matter of any one of Examples 38 to 40 can optionally include wherein the beamforming controller is configured to determine the updated set of beamforming weights in the search space by determining the updated set of beamforming weights based on a least-squares problem that generates a result with minimized difference between the target radiation pattern and the actual radiation pattern.

In Example 42, the subject matter of Example 41 can optionally include wherein the least-squares problem includes contribution from each of the plurality of elements of the antenna array to each of the plurality of main fingers of the target radiation pattern.

In Example 43, the subject matter of any one of Examples 38 to 42 can optionally include wherein the search space for the updated set of beamforming weights constrains the updated set of beamforming weights to have unity gain.

In Example 44, the subject matter of any one of Examples 38 to 42 can optionally include wherein the set of beamforming weights are phase-only beamforming weights located on the unit circle.

In Example 45, the subject matter of any one of Examples 38 to 44 can optionally include wherein, for a first element of the plurality of elements, the search space for the updated beamforming weight is a tangent line of the unit circle at a current beamforming weight of the first element, and wherein the beamforming controller is configured to determine the updated set of beamforming weights in the search space by determining a solution to a least-squares problem along the tangent line for the first element of the antenna array, locating the closest point on the unit circle to the solution on the tangent line for the first element of the antenna array, and using the closest point on the unit circle as the updated beamforming weight for the first element of the antenna array in the updated set of beamforming weights.

In Example 46, the subject matter of any one of Examples 38 to 45 can optionally include wherein the beamforming controller is configured to determine the set of beamforming weights for the antenna array by iteratively identifying the search space and determining the updated set of beamforming weights until the updated set of beamforming weights satisfies a convergence condition.

In Example 47, the subject matter of Example 46 can optionally include wherein the beamforming controller is further configured to, in each of the plurality of iterations determine the actual radiation pattern based on the updated set of beamforming weights obtained in the iteration, determine an error term based on the difference between the actual radiation pattern and the desired radiation pattern, determine that the convergence condition is satisfied if the error term is less than a predefined convergence parameter.

In Example 48, the subject matter of Example 46 or 47 can optionally include wherein the beamforming controller is further configured to after the updated set of beamforming weights satisfies the convergence condition, update a maximum main finger power level or update a maximum sidelobe power level based on the actual radiation pattern produced by the updated set of complex beamforming weights, and iteratively re-determine the set of beamforming weights for the antenna array by identifying the search space and solve for the updated set of beamforming parameters based on the maximum main finger power level and the maximum sidelobe power level.

In Example 49, the subject matter of Example 48 can optionally include wherein the beamforming controller is configured to update the maximum main finger power level or update the maximum sidelobe power level by incrementing the maximum sidelobe power level or decrementing the maximum main finger power level.

In Example 50, the subject matter of any one of Examples 38 to 49 can optionally include wherein the target radiation pattern is defined over one or more main finger angles and one or more sidelobe angles, and wherein the beamforming controller is configured to determine the updated set of beamforming weights by determining an updated set of beamforming weights for which the actual radiation pattern has predetermined ratios between the power levels of the one or more main finger angles.

In Example 51, the subject matter of any one of Examples 38 to 50 can optionally include wherein the beamforming controller is further configured to identify a new target radiation pattern based on adaptive beamforming, and iteratively determine a new set of beamforming weights for the antenna array based on the new target radiation pattern.

In Example 52, the subject matter of Example 51 can optionally include wherein the antenna array is further configured to transmit or receive radio signals with the antenna array based on the new set of beamforming weights.

In Example 53, the subject matter of any one of Examples 38 to 52 can optionally further include a transmit or receive path that interfaces with the antenna array and the beamforming controller.

Example 54 is a communication device for synthesis of radiation patterns for antenna arrays, the communication device including a beamforming controller including one or more processors or digitally-configured hardware circuitry, the beamforming controller configured to iteratively determine a set of beamforming weights for an antenna array based on a target radiation pattern, wherein the beamforming controller is configured to, for each of a plurality of iterations identify a search space for an updated set of beamforming weights for a plurality of elements of the antenna array, and determine, based reducing a difference between an actual radiation pattern and the target radiation pattern, the updated set of beamforming weights in the search space based on a first set of angles of the target radiation pattern having an optimization constraint and a second set of angles of the target radiation pattern having an upper-bound power level constraint, the beamforming controller further configured to select the updated set of beamforming weights as the set of beamforming weights.

In Example 55, the subject matter of Example 54 can optionally further include the antenna array, wherein the antenna array is configured to transmit or receive radio signals based on the set of beamforming weights.

In Example 56, the subject matter of Example 54 or 55 can optionally further include a transmit or receive path.

In Example 57, the subject matter of any one of Examples 54 to 56 can optionally include wherein the actual radiation pattern characterizes the radiation pattern produced by applying the updated set of beamforming weights at an antenna array.

In Example 58, the subject matter of any one of Examples 54 to 57 can optionally include wherein the target radiation pattern is defined over one or more main finger angles and one or more sidelobe angles.

In Example 59, the subject matter of Example 58 can optionally include wherein the beamforming controller is further configured to, in each iteration determine if the actual radiation pattern at any of the one or more sidelobe angles in the first set of angles is below a target power level, and move the identified sidelobe angles to the second set of angles if the actual radiation pattern is below the target power level In Example 60, the subject matter of Example 59 can optionally include wherein the first set of angles initially includes all of the one or more main finger angles and all of the one or more sidelobe angles.

In Example 61, the subject matter of any one of Examples 54 to 60 can optionally include wherein the beamforming controller is configured to determine the updated set of beamforming weights by determining a solution for least-squares problem for the first set of angles based on the optimization constraint while constraining the updated set of beamforming weights to keep the actual radiation pattern below target power levels at the second set of angles.

In Example 62, the subject matter of Example 61 can optionally include wherein the optimization constraint minimizes the difference between target power levels at the first set of angles of the target radiation pattern and the power levels at the first set of angles of the actual radiation pattern.

In Example 63, the subject matter of any one of Examples 54 to 62 can optionally include wherein the beamforming controller is configured to iteratively determine the set of beamforming weights for the antenna array by iteratively identifying the search space and determining the updated set of beamforming weights until the updated set of beamforming weights satisfies a convergence condition.

In Example 64, the subject matter of Example 63 can optionally include wherein the beamforming controller is further configured to, in each iteration determine the actual radiation pattern based on the updated set of beamforming weights obtained in the iteration, determine an error term based on the difference between the actual radiation pattern and the desired radiation pattern, and determine that the convergence condition is satisfied if the error term is less than a predefined convergence parameter.

In Example 65, the subject matter of any one of Examples 54 to 64 can optionally include wherein the set of beamforming weights are for phase-only beamforming and wherein the search space constrains the updated set of beamforming weights to locations on the unit circle.

In Example 66, the subject matter of any one of Examples 54 to 65 can optionally include wherein, for a first element of the plurality of elements, the search space for the updated beamforming weight is a tangent line of the unit circle at a current beamforming weight of the first element, and wherein the beamforming controller is configured to solve for the updated set of beamforming weights in the search space by determining a solution to a least-squares problem for the first set of angles along the tangent line for the first element, locating the closest point on the unit circle to the solution on the tangent line for the first element, and using the closest point on the unit circle as the updated beamforming weight for the first element in the updated set of beamforming weights.

In Example 67, the subject matter of any one of Examples 54 to 64 can optionally include wherein the set of beamforming weights are for phase control with amplitude tapering beamforming and wherein the search space constrains the updated set of beamforming weights locations within a two-dimensional ring including radial distances between a minimum tapering amplitude and the unit circle.

In Example 68, the subject matter of any one of Examples 54 to 64 or 67 can optionally include wherein, for a first element of the plurality of elements, the search space for the updated beamforming weight is a region between the unit circle and a line intersecting the unit circle that is perpendicular to the line between the origin of the unit circle and a current beamforming weight, and wherein the beamforming controller is configured to determine the updated set of beamforming weights in the search space by determining the updated set of beamforming weights in the region.

In Example 69, the subject matter of any one of Examples 54 to 64 can optionally include wherein the set of beamforming weights are phase and amplitude control beamforming and wherein the search space constrains the updated set of beamforming weights locations within the unit circle.

In Example 70, the subject matter of any one of Examples 54 to 64 or 69 can optionally include wherein, for a first element of the plurality of elements, the search space for the updated beamforming weight is the unit circle, and wherein the beamforming controller is configured to determine the updated set of beamforming weights in the search space by determining the updated set of beamforming weights in the unit circle.

In Example 71, the subject matter of any one of Examples 54 to 70 can optionally include wherein the beamforming controller is configured to iteratively calculate the set of beamforming weights offline to generate a beamforming codebook including sets of beamforming weights for different target radiation patterns.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
an antenna array; and
a beamforming controller configured to:
  determine a set of beamforming weights for the antenna array based on a target radiation pattern having target main finger power levels for a plurality of main fingers and a target maximum sidelobe power level, wherein the beamforming controller is configured to determine the set of beamforming weights by, in each of a plurality of iterations:
  identifying a search space of beamforming weights for a plurality of antenna elements of the antenna array, and
  updating, based on estimated main finger power levels and estimated sidelobe power levels of the set of beamforming weights, the set of beamforming weights within the search space to reduce a difference between the estimated main finger power levels and the target main finger power levels and to reduce the estimated sidelobe power levels toward or below the target maximum sidelobe power level,
  and wherein the beamforming controller is further configured to:
  update, based on the estimated main finger power levels and estimated sidelobe power levels, the target main finger power levels or the target maximum sidelobe power level to obtain an updated target main finger power level or an updated target maximum sidelobe power level; and
  iteratively re-update the set of beamforming weights based on the updated target main finger power level or the updated target maximum sidelobe power level;
  the antenna array configured to transmit or receive radio signals based on the set of beamforming weights.

2. The communication device of claim 1, wherein the beamforming controller comprises one or more processors configured to execute program code or as digitally-configured hardware circuitry.

3. The communication device of claim 1, wherein the beamforming controller is configured to update the set of beamforming weights by determining the estimated main finger power levels and the estimated sidelobe power levels based on current values of the set of beamforming weights for a current iteration.

4. The communication device of claim 1, wherein the beamforming controller is configured to update the set of beamforming weights within the search space by updating the set of beamforming weights based on a least-squares problem that attempts to minimize a difference between the target radiation pattern and an estimated radiation pattern comprising the estimated main finger power levels and the estimated sidelobe power levels.

5. The communication device of claim 1, wherein the set of beamforming weights are phase-only beamforming weights located on the unit circle.

6. The communication device of claim 1, wherein, for a first antenna element of the plurality of antenna elements of the antenna array, the search space for the beamforming weight is a tangent line of the unit circle at the beamforming weight of the first antenna element of the plurality of antenna elements of the antenna array, and wherein the beamforming controller is configured to update the set of beamforming weights within the search space by:
  determining a solution to a least-squares problem along the tangent line for the first antenna element of the plurality of antenna elements of the antenna array;
  locating a closest point on the unit circle to the solution on the tangent line for the first antenna element of the plurality of antenna elements of the antenna array; and
  updating the beamforming weight for the first antenna element of the plurality of antenna elements of the antenna array to be the closest point on the unit circle.

7. The communication device of claim 1, wherein the beamforming controller is configured to update the set of beamforming weights for the antenna array by:
  iteratively identifying the search space and updating the set of beamforming weights until the set of beamforming weights satisfies a convergence criterion.

8. A communication device for synthesis of radiation patterns for antenna arrays, the communication device comprising:
  an antenna array; and
  a beamforming controller configured to:
  determine, based on a target radiation pattern comprising one or more main finger angles and one or more sidelobe angles, a set of beamforming weights for an antenna array by, for each of a plurality of iterations:
  identifying a search space for beamforming weights for a plurality of antenna elements of the antenna array,
  updating the set of beamforming weights within the search space based on reducing a difference between an estimated radiation pattern and the target radiation pattern at a first set of angles and further based on maintaining power levels of the estimated radiation pattern below upper-bound power levels of the target radiation pattern at a second set of angles, and
  determining if the estimated radiation pattern at any of the one or more sidelobe angles in the first set of angles is below one of the upper-bound power levels and assigning these sidelobe angles to the second set of angles for a next iteration of the plurality of iterations;
  the antenna array configured to transmit or receive radio signals based on the set of beamforming weights.

9. The communication device of claim 8, wherein updating the set of beamforming weights comprises determining the estimated radiation pattern based on current values of the set of beamforming weights for a current iteration.

10. The communication device of claim 8, wherein the beamforming controller is configured to update the set of beamforming weights by:
  determining a solution for least-squares problem for the first set of angles that reduces the difference between the estimated radiation pattern and the target radiation pattern while constraining the set of beamforming weights to keep the estimated radiation pattern below the upper-bound power levels at the second set of angles.

11. The communication device of claim 8, wherein the beamforming controller is configured to determine the set of beamforming weights for the antenna array by:
  iteratively identifying the search space and updating the set of beamforming weights until the set of beamforming weights satisfies a convergence criterion.

12. The communication device of claim 8, wherein the set of beamforming weights are for phase-only beamforming and wherein the search space constrains the set of beamforming weights to locations on the unit circle.

13. The communication device of claim 8, wherein, for a first antenna element of the plurality of antenna elements of the antenna array, the search space for the beamforming weight is a tangent line of the unit circle at a current value of the beamforming weight of the first antenna element of the plurality of antenna elements of the antenna array, and wherein the beamforming controller is configured to solve for the set of beamforming weights within the search space by:
  determining a solution to a least-squares problem for the first set of angles along the tangent line for the first antenna element;
  locating a closest point on the unit circle to the solution on the tangent line for the first antenna element of the plurality of antenna elements of the antenna array; and
  using the closest point on the unit circle as the beamforming weight for the first antenna element of the plurality of antenna elements of the antenna array in the set of beamforming weights.

14. The communication device of claim 8, wherein the set of beamforming weights are for phase control with amplitude tapering beamforming and wherein the search space constrains the set of beamforming weight locations within a two-dimensional ring comprising radial distances between a minimum tapering amplitude and the unit circle.

15. The communication device of claim 8, wherein, for a first antenna element of the plurality of antenna elements of the antenna array, the search space for the beamforming weight is a region between the unit circle and a line intersecting the unit circle that is perpendicular to the line between the origin of the unit circle and a current value of the beamforming weight, and wherein the beamforming controller is configured to update the set of beamforming weights within the search space by updating the set of beamforming weights in the region.

16. The communication device of claim 8, wherein the set of beamforming weights are phase and amplitude control beamforming and wherein the search space constrains the set of beamforming weights locations within the unit circle.

17. A method of performing beamforming, the method comprising:
  determining, based on a target radiation pattern having target main finger power levels for a plurality of main fingers and a target maximum sidelobe power level, a set of beamforming weights for an antenna array by performing a plurality of iterations of:
  identifying a search space of beamforming weights for a plurality of antenna elements of the antenna array, and
  updating, based on estimated main finger power levels and estimated sidelobe power levels of a current set of beamforming weights, the set of beamforming weights within the search space to reduce a difference between the estimated main finger power levels and the target main finger power levels and to reduce the estimated sidelobe power levels toward or below the target maximum sidelobe power level;
  updating, based on the estimated main finger power levels and estimated sidelobe power levels, the target main finger power levels or the target maximum sidelobe power level to obtain an updated target main finger power level or an updated target maximum sidelobe power level,
  iteratively re-updating the set of beamforming weights based on the updated target main finger power level or the updated target maximum sidelobe power level, and
  transmitting or receiving radio signals with the antenna array based on the set of beamforming weights.

18. The method of claim 17, wherein updating the set of beamforming weights comprises determining the estimated main finger power levels and the estimated sidelobe power levels based on current values of the set of beamforming weights for a current iteration.

\* \* \* \* \*